United States Patent
Xu

(10) Patent No.: US 11,638,192 B2
(45) Date of Patent: *Apr. 25, 2023

(54) METHOD AND DEVICE FOR DETERMINING AND SENDING POLICY

(71) Applicant: GUANGDONG OPPO MOBILE TELECOMMUNICATIONS CORP., LTD., Guangdong (CN)

(72) Inventor: Yang Xu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/691,292

(22) Filed: Mar. 10, 2022

(65) Prior Publication Data
US 2022/0201578 A1 Jun. 23, 2022

Related U.S. Application Data

(63) Continuation of application No. 17/227,111, filed on Apr. 9, 2021, now Pat. No. 11,310,712, which is a (Continued)

(30) Foreign Application Priority Data

Jun. 17, 2019 (WO) ................ PCT/CN2019/091566

(51) Int. Cl.
*H04W 36/14* (2009.01)
*H04W 8/18* (2009.01)
(Continued)

(52) U.S. Cl.
CPC ............ *H04W 36/14* (2013.01); *H04W 8/18* (2013.01); *H04W 24/02* (2013.01);
(Continued)

(58) Field of Classification Search
CPC ....... H04W 36/14; H04W 8/18; H04W 24/02; H04W 36/0033; H04W 48/16;
(Continued)

(56) References Cited

U.S. PATENT DOCUMENTS 8,812,020 B2 8/2014 Marsico
9,241,305 B2 * 1/2016 Cui ........................ H04W 48/18
(Continued)

FOREIGN PATENT DOCUMENTS

CN 101483853 A 7/2009
CN 103503522 A 1/2014
(Continued)

OTHER PUBLICATIONS

International Search Report dated Mar. 25, 2020 cited in PCT/CN2019/100672.
(Continued)

*Primary Examiner* — Nam T Huynh
(74) *Attorney, Agent, or Firm* — Perkins Coie LLP

(57) ABSTRACT

The present disclosure provides a method and a device for determining and sending a policy, and provides a specific method for a terminal device to use a user equipment (UE) policy. Said method includes: a terminal device determining, according to first information, a UE policy used by the terminal device, the first information including at least one piece of the following information: an area where the terminal device is located, a public land mobile network (PLMN) identity (ID) corresponding to the network in which the terminal device is registered or resides, and a usage duration of the UE policy.

15 Claims, 9 Drawing Sheets

Related U.S. Application Data continuation of application No. PCT/CN2019/100672, filed on Aug. 14, 2019.

(51) Int. Cl.
  *H04W 24/02* (2009.01)
  *H04W 36/00* (2009.01)
  *H04W 48/18* (2009.01)
  *H04W 48/16* (2009.01)
  *H04W 84/04* (2009.01)
  *H04W 60/00* (2009.01)

(52) U.S. Cl.
  CPC ....... *H04W 36/0033* (2013.01); *H04W 48/16* (2013.01); *H04W 48/18* (2013.01); *H04W 60/00* (2013.01); *H04W 84/042* (2013.01)

(58) Field of Classification Search
  CPC ... H04W 48/18; H04W 60/00; H04W 84/042; H04W 8/245; H04W 48/04; H04W 4/02; H04W 60/04; H04W 8/02; H04W 48/10; H04W 64/00
  See application file for complete search history.

(56) References Cited

U.S. PATENT DOCUMENTS

| | | | |
|---|---|---|---|
| 2012/0094685 | A1 | 4/2012 | Marsico |
| 2015/0350090 | A1 | 12/2015 | Peck et al. |
| 2018/0227267 | A1 | 8/2018 | Joul |
| 2021/0037380 | A1 | 2/2021 | Lee et al. |

FOREIGN PATENT DOCUMENTS

| | | | |
|---|---|---|---|
| CN | 103813415 | A | 5/2014 |
| CN | 103945493 | A | 7/2014 |
| CN | 104604299 | A | 5/2015 |
| CN | 104838696 | A | 8/2015 |
| CN | 104956736 | A | 9/2015 |
| CN | 105052210 | A | 11/2015 |
| CN | 106303944 | A | 1/2017 |
| CN | 108040367 | A | 5/2018 |
| CN | 108718457 | A | 10/2018 |
| CN | 109600761 | A | 4/2019 |
| CN | 109862581 | A | 6/2019 |
| CN | 109891962 | A | 6/2019 |
| WO | 2015174456 | A1 | 11/2015 |
| WO | 2018175029 | A1 | 9/2018 |

OTHER PUBLICATIONS

"NR and NG-RAN Overall Description, Stage 2 (Release 15)", 3GPP TS 38. 300 v15. 5. 0, Apr. 9, 2019.
International Search Report dated Feb. 18, 2020 cited in PCT/CN2019/091566.
First Office Action for Chinese Application No. 202010687186.8 dated Oct. 11, 2021. 12 pages with English translation.
Partial supplementary European Search Report for European Application No. 19933522.5 dated Oct. 14, 2021. 12 pages.
Extended European Search Report for European Application No. 19933522.5 dated Jan. 24, 2022. 11 pages.
Examination Report for Indian Application No. 202127021103 dated Feb. 23, 2022. 7 pages with English translation.
Nokia, et al., "R3-184431, 3GPP TSG-RAN WG3#101", Aug. 24, 2018.
Marvell et al. "Proposal on the interaction between ANDSF and IMS Service Continuity" 3GPP TSG SA WG2 Meeting #71; TD S2-091279; Feb. 16-20, 2009; Budapest, Hungary. 9 pages.
Notice of Reasons for Refusal for Japanese Application No. 2021-541514 dated Aug. 26, 2022. 10 pages with English translation.
Office Action for Korean Application No. 2021-7022929 dated Jun. 28, 2022. 6 pages with English translation.
Examination Report for European Application No. 19933522.5 dated Oct. 7, 2022. 3 pages.

\* cited by examiner

METHOD AND DEVICE FOR DETERMINING AND SENDING POLICY

CROSS-REFERENCE TO RELATED APPLICATIONS

This application is a continuation application of U.S. application Ser. No. 17/227,111 filed on Apr. 9, 2021, which is a continuation application of International PCT Application No. PCT/CN2019/100672, the International PCT application has an international filing date of Aug. 14, 2019, and claims priority to PCT Application No. PCT/CN2019/091566, filed to the Chinese Patent Office on Jun. 17, 2019 and entitled "Method for Determining and Sending a Policy and Device". The present disclosure claims priority and the benefit of the above-identified applications and the above-identified applications are incorporated by reference herein in their entirety.

TECHNICAL FIELD

The present disclosure relates to the field of communication, and more particularly, to a method for determining and sending a policy and a device.

BACKGROUND

At present, a terminal device may obtain a user equipment (UE) policy from a policy control function (PCF) network element, and use the UE policy to perform a wireless local area network (WLAN) selection and/or a UE route selection.

Under different scenarios, UE policies used by terminal devices may be different. However, there is no clear solution for how the terminal device determines a UE policy to be used and how to choose a rule by which a UE policy may be divided.

SUMMARY

The present disclosure provides a method for determining and sending a policy and a device, which provide a clear method for a terminal device to use a UE policy.

In a first aspect, a method for determining a policy is provided, including: determining, by a terminal device, a user equipment (UE) policy used by the terminal device according to first information, wherein the first information includes at least one piece of following information: an area where the terminal device is located, a public land mobile network (PLMN) identity (ID) corresponding to a network where the terminal device registered or camped, and a usage duration of the UE policy.

In a second aspect, a method for sending a policy is provided, including: sending, by a first network, a user equipment (UE) policy used by a terminal device to the terminal device according to first information, wherein the first information includes at least one piece of following information: an area where the terminal device is located, a public land mobile network (PLMN) identity (ID) corresponding to a network where the terminal device registered or camped, and a usage duration of the UE policy.

In a third aspect, a method for sending a policy is provided, including: receiving, by a policy control function (PCF) network element, configuration information of a radio access network (RAN) notification area (RNA) sent by an access network; and dividing, by the PCF network element, a policy area according to the configuration information of the RNA, wherein the policy area is used for the PCF network element to send a user equipment (UE) policy used by a terminal device to the terminal device.

In a fourth aspect, a method for sending a policy is provided, including: receiving, by an access network, configuration information of a policy area sent by a policy control function (PCF) network element, wherein the policy area is used for the PCF network element to send a UE policy used by a terminal device to the terminal device; and dividing, by the access network, an access network notification area (RNA) according to the configuration information of the policy area.

In a fifth aspect, a terminal device is provided, configured to perform the method in the above first aspect or various implementation modes thereof.

Specifically, the terminal device includes function modules for performing the method in the above first aspect or various implementation modes thereof.

In a sixth aspect, a network device is provided, configured to perform the method in the above second aspect, the third aspect, the fourth aspect or various implementation modes thereof.

Specifically, the network device includes function modules for performing the method in the above second aspect, the third aspect, the fourth aspect or various implementation modes thereof.

In a seventh aspect, a terminal device is provided, including a processor and a memory. The memory is configured to store a computer program, and the processor is configured to call and run the computer program stored in the memory to execute the method in the above first aspect or various implementation modes thereof.

In an eighth aspect, a network device is provided, including a processor and a memory. The memory is configured to store a computer program, and the processor is configured to call and run the computer program stored in the memory to execute the method in the above second aspect, the third aspect, the fourth aspect or various implementation modes thereof.

In a ninth aspect, an apparatus is provided, configured to implement the method in any one of the above first to fourth aspects or various implementation modes thereof.

Specifically, the apparatus includes a processor, configured to call and run a computer program from a memory, so that a device provided with the apparatus performs the method in any one of the above first to fourth aspects or various implementation modes thereof.

In a tenth aspect, a computer readable storage medium is provided, configured to store a computer program, wherein the computer program causes a computer to perform the method in any one of the above first to fourth aspects or various implementation modes thereof.

In an eleventh aspect, a computer program product is provided, including computer program instructions, wherein the computer program instructions cause a computer to perform the method in any one of the above first to fourth aspects or various implementation modes thereof.

In a twelfth aspect, a computer program is provided, which, when running on a computer, causes the computer to perform the method in any one of the above first to fourth aspects or various implementation modes thereof.

According to the technical solution provided by the present disclosure, when a terminal device determines a UE policy to be used, it may determine the UE policy according to an area where the terminal device is located, a PLMN ID corresponding to a network to which the terminal device is connected, and/or a usage duration of the UE policy, which provides a clear method for the terminal device to determine the UE policy.

DETAILED DESCRIPTION

Figure 1:
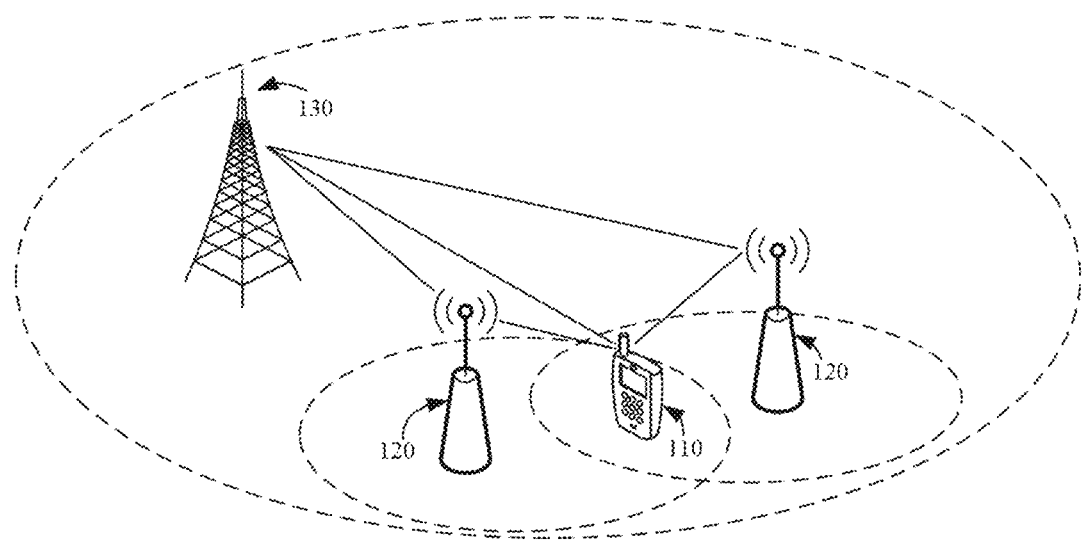
FIG. 1 is a schematic diagram of a wireless communication system applied in an implementation of the present disclosure.

FIG. 1 is a schematic diagram of a system 100 according to an implementation of the present disclosure.

As shown in FIG. 1, a terminal device 110 is connected to a first network device 130 under a communication system and a second network device 120 under a second communication system. For example, the first network device 130 is a network device under Long Term Evolution (LTE), and the second network device 120 is a network device under New Radio (NR).

Herein, the first network device 130 and the second network device 120 may include multiple cells.

It should be understood that FIG. 1 is an example of a communication system according to an implementation of the present disclosure, and implementations of the present disclosure are not limited to that shown in FIG. 1.

As an example, a communication system to which an implementation of the present disclosure is applied may at least include multiple network devices under the first communication system and/or multiple network devices under the second communication system.

For example, the system 100 shown in FIG. 1 may include one primary network device under a first communication system and at least one secondary network device under a second communication system. The at least one secondary network device is respectively connected with the primary network device to form a multi-connectivity, and is respectively connected with the terminal device 110 to provide a service for the terminal device. Specifically, the terminal device 110 may establish a connection through the primary network device and the secondary network device simultaneously.

Optionally, the connection established between the terminal device 110 and the primary network device is a primary connection, and the connection established between the terminal device 110 and the secondary network device is a secondary connection. Control signaling of the terminal device 110 may be transmitted through the primary connection, while data of the terminal device 110 may be transmitted through the primary connection and the secondary connection simultaneously, or may be transmitted through the secondary connection only.

As another example, the first communication system and the second communication system in implementations of the present disclosure are different, but specific categories of the first communication system and the second communication system are not restricted.

For example, the first communication system and the second communication system may be various communication systems, such as a Global System of Mobile Communication (GSM) system, a Code Division Multiple Access (CDMA) system, a Wideband Code Division Multiple Access (WCDMA) system, a General Packet Radio Service (GPRS) system, a Long Term Evolution (LTE) system, an LTE Time Division Duplex (TDD) system, a Universal Mobile Telecommunication System (UMTS).

The primary network device and the secondary network device may be any access network device.

Optionally, in some implementations, the access network device may be a Base Transceiver Station (BTS) in a Global System of Mobile Communication (GSM) system or a Code Division Multiple Access (CDMA); or may be a NodeB (NB) in a Wideband Code Division Multiple Access (WCDMA) system; or may be an Evolutional Node B (eNB or eNodeB) in a Long Term Evolution (LTE) system.

Optionally, the access network device may also be a base station (gNB) in a Next Generation Radio Access Network (NG RAN) or an NR system, or a radio controller in a Cloud Radio Access Network (CRAN), or the access network device may be a relay station, an access point, an on-board device, a wearable device, or a network device in a future evolved Public Land Mobile Network (PLMN), etc.

In the system 100 shown in FIG. 1, for example, the first network device 130 is used as the primary network device, and the second network device 120 is used as the secondary network device.

The first network device 130 may be an LTE network device, and the second network device 120 may be an NR network device. Or the first network device 130 may be an NR network device, and the second network device 120 may be an LTE network device. Or both the first network device 130 and the second network device 120 may be NR network devices. Or the first network device 130 may be a GSM network device, or a CDMA network device, etc., and the second network device 120 may also be a GSM network device, or a CDMA network device, etc. Or the first network device 130 may be a Macrocell, and the second network device 120 may be a Microcell, a Picocell or a Femtocell, etc.

Optionally, the terminal device 110 may be any terminal device, and the terminal device 110 includes but is not limited to: being connected via a wired circuit, for example, being connected via a Public Switched Telephone Networks (PSTN), a Digital Subscriber Line (DSL), a digital cable, a direct cable; and/or another data connection/network; and/or via a wireless interface, for instance, for a cellular network, a Wireless Local Area Network (WLAN), a digital television network such as a DVB-H network, a satellite network, an AM-FM broadcast sender; and/or an apparatus, of another terminal device, configured to receive/send a communication signal; and/or an Internet of Things (IoT) device. A terminal device configured to communicate via a wireless interface may be referred to as a "wireless communication terminal", a "wireless terminal" or a "mobile terminal". Examples of the mobile terminal include, but not limited to, a satellite or cellular telephone, a Personal Communication System (PCS) terminal capable of combining with a cellular wireless telephone and data processing, faxing, and data communication abilities, a Personal Digital Assistant (PDA) that may include a radio telephone, a pager, an internet/intranet access, a Web browser, a memo pad, a calendar, and/or a Global Positioning System (GPS) receiver, and a conventional laptop and/or palmtop receiver or another electronic apparatus including a radio telephone transceiver. The terminal device may be referred to as an access terminal, a User Equipment (UE), a subscriber unit, a subscriber station, a mobile station, a mobile platform, a remote station, a remote terminal, a mobile device, a user terminal, a terminal, a wireless communication device, a user agent or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or another processing device connected to a wireless modem, a vehicle-mounted device, a wearable device, a terminal device in a 5G network, or a terminal device in a future evolved Public Land Mobile Network (PLMN), or the like.

It should be understood that the terms "system" and "network" are often used interchangeably in this document.

A terminal device may acquire a UE policy from a Policy Control function (PCF) network element to perform WLAN selection and UE routing according to the UE policy.

Figures 2, 3:
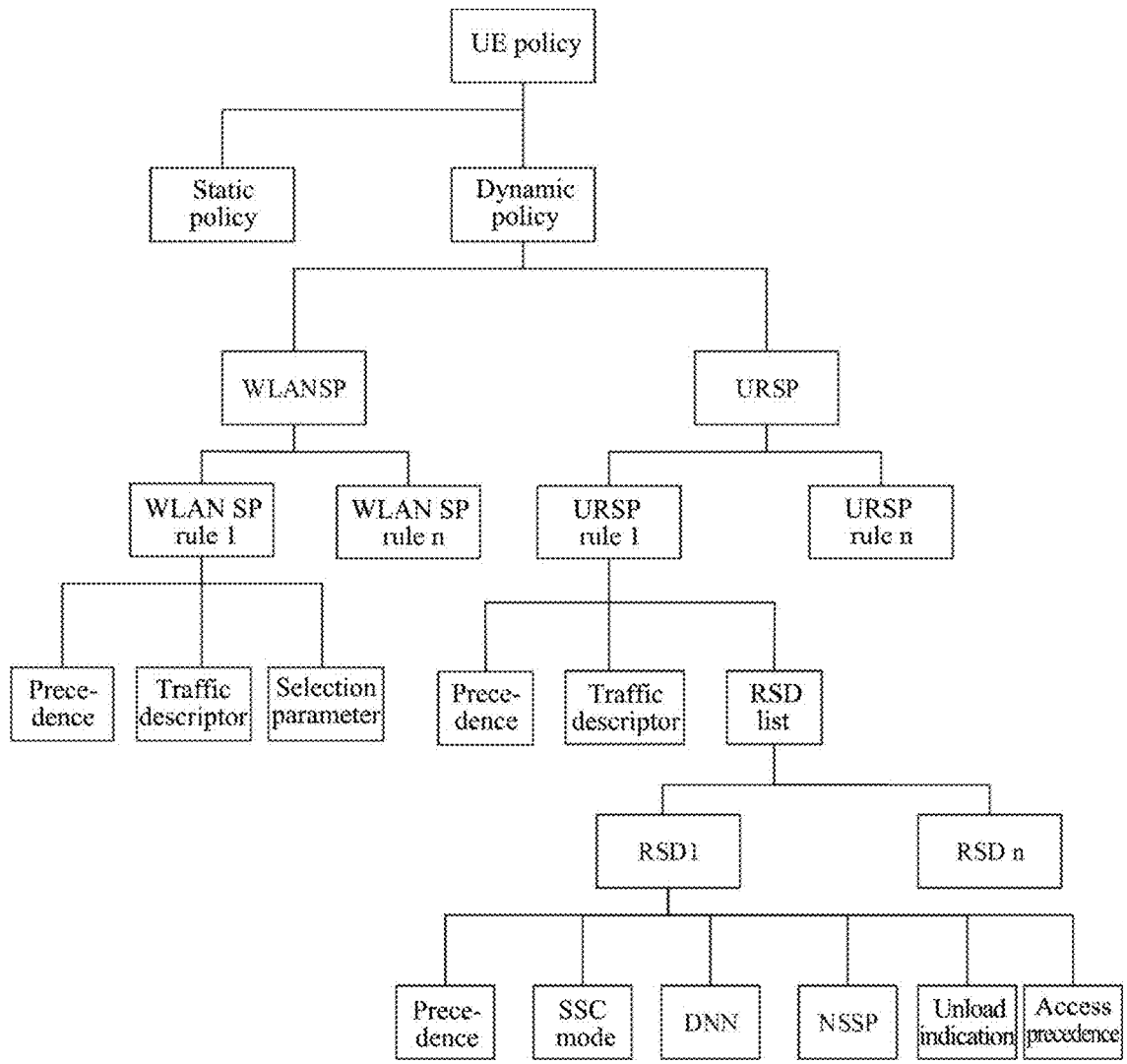
FIG. 2 is a schematic diagram of a UE policy according to an implementation of the present disclosure.
FIG. 3 is a schematic flow chart of a method for sending a policy according to an implementation of the present disclosure.

An implementation of the present disclosure does not restrict a specific content of the UE policy. As shown in FIG. 2, the UE policy may include a static policy and a dynamic policy, and the dynamic policy may include a WLAN selection policy (WLANSP), an Access Network Discovery and selection Policy (ANDSP), and a UE Route Selection Policy (URSP).

The WLANSP may include at least one WLANSP rule, as shown in FIG. 2, one WLANSP may include WLANSP rule 1, . . . , WLANSP rule n, wherein n is a positive integer. One WLANSP rule may include, for example, a precedence, a traffic descriptor and/or a selection parameter, etc., and the terminal device may select WLAN according to at least one WLANSP rule. For example, the terminal device may select WLAN according to a precedence, and the terminal device may preferentially select WLAN with a higher precedence.

URSP may include at least one URSP rule, as shown in FIG. 2, URSP may include URSP rule 1, . . . , URSP rule n, wherein n is a positive integer. One URSP rule may include a precedence, a traffic descriptor and/or a route selecting descriptor (RSD) list, etc. Each Traffic Descriptor may correspond to one RSD list, which is used for the terminal device to select which parameters in the RSD list to be used for determining a binding relationship between an application corresponding to the Traffic Descriptor and a session. The terminal device may select a route for an application according to at least one URSP rule, that is, different applications are bound to sessions with different attribute parameters for data transmission. Herein, one RSD list includes a session attribute parameter and another routing related parameter, for example, it may include at least one of following: a precedence, a session and service continuity (SSC) mode, a date network name (DNN), a network slice selection policy (NSSP), a non-seamless unload indication, an access precedence, etc.

The NSSP contains one or more Single Network Slice Selection Assistance Information (S-NSSAI), which may or may not have a precedence. The terminal device selects one S-NSSAI for each application in the URSP according to the NSSP corresponding to the application, and the S-NSSAI must be an allowed S-NSSAI (i.e., Allowed S-NSSAI) under the PLMN configured by a network side to the terminal device. Generally, the Allowed S-NSSAI is sent to a terminal through a registration response message or a UE configuration update (UCU) command message triggered by an access and mobility management function (AMF), while the UE policy (containing the URSP) is sent to the terminal device through a UCU command message triggered by PCF, and they are independent in flow. If an allowed S-NSSAI corresponding to one PLMN issued by the network side used by the terminal device is also applicable to the network slice information for an equivalent PLMN of the PLMN, another PLMN contained in a tracking area identity (TAI) of a registration area or a TAI list area, or other specified multiple PLMNs, then usage of a UE policy may also follow a policy similar to the policy that is shared by an Allowed NSSAI on multiple PLMNs. In this way, a unified behavior of the terminal within a certain area or under a certain condition may be ensured, and it is guaranteed that business continuity will not be affected by change of the terminal between different PLMNs.

For example, if the registration area received by the terminal device contains TAI-1 (TAI-1=PLMN-1+TAC1) and TAI2 (TAI-2=PLMN-2+TAC-2), an Allowed NSSAI of the terminal device in PLMN-1 is an allowed S-NSSAI1 an S-NSSAI-2 and an S-NSSAI-3, and an Allowed NSSAI in PLMN-2 is an allowed S-NSSAI-3, an S-NSSAI-4 and an S-NSSAI-5, when the terminal device moves from TAI-1 to TAI-2 and still uses a URSP policy corresponding to PLMN-1, but the terminal device uses an Allowed NSSAI corresponding to PLMN-2, then the terminal device may only choose the S-NSSAI-3 as a parameter applied to the PDU session association, and it is very obvious that such terminal action is false.

According to the above description, a PLMN identity (ID) corresponding to the UE policy used by the terminal device should be consistent with a PLMN ID selected by the terminal device. Optionally, the PLMN ID corresponding to the UE policy and the PLMN ID corresponding to the NSSAI are the same, or both are in a same list of equivalent PLMNs or in a PLMN set indicated by a same RA/TA List. The NSSAI may be an Allowed NSSAI or Mapping of Allowed NSSAI in a roaming scenario.

In a non-roaming scenario, the Allowed NSSAI is a network slicing parameter which a network where the terminal device registered allows the terminal device to use. In a roaming scenario, not only an Allowed NSSAI of a visiting place but also mapping of Allowed NSSAI of a home place should be considered, because values of two NSSAI parameters may be different.

A content of the URSP policy is shown in Table 1 and Table 2 below. Table 1 shows a URSP rule, and Table 2 shows an RSD list.

TABLE 1

| Information name | Description | Policy | PCF permitted to modify in a UE context | Range |
|---|---|---|---|---|
| Rule precedence | Determine an order in which the URSP rule is enforced in a UE | Mandatory | Yes | UE context |
| Service descriptor | This part defines a traffic descriptor of a policy | | | |
| Application identity | Application identity | Optional | Yes | UE context |
| Internet protocol (IP) Descriptor | IP 3 tuples (a destination IP address or an IPv6 network prefix, a destination port number, a protocol ID of a protocol above an IP) | Optional | Yes | UE context |
| Non-IP descriptor | Descriptor of non-IP traffic | Optional | Yes | UE context |
| RSD list | List of Route Selection Descriptors | Mandatory | | |

Note 1:
Rules in URSP shall have different precedence values

TABLE 2

| Information name | Description | Policy | PCF permitted to modify in a UE context | Range |
|---|---|---|---|---|
| RSD precedence | Determine an order in which Route Selection Descriptors are to be applied | Mandatory | Yes | UE context |
| Route selection component | This part defines a route selection component | Mandatory | | |
| SSC mode selection | Single value of SSC mode | Optional | Yes | UE context |
| Network slice selection | Either a single value or a list of values of S-NSSAI | Optional | Yes | UE context |
| DNN selection | A value or a list of values of DNN | Optional | Yes | UE context |
| Non-seamless unload | Indicate whether to offload traffic which matches an application | Optional | Yes | UE context |

TABLE 2-continued

| Information name | Description | Policy | PCF permitted to modify in a UE context | Range |
|---|---|---|---|---|
| indication | to non-3rd generation partnership project (3GPP) access outside a PDU session | | | |
| Access type precedence | When a UE establishes a PDU session for a matching application, indicate a preferred access type (3GPP or non-3 GPP) | Optional | Yes | UE context |

Note 1:
Each route selection descriptor in a list shall have different precedence values.
Note 2:
There should be at least one route selection component.
Note 3:
If the indication exists in the route selection descriptor, then other components shall not be included in the route selection descriptor.

The terminal device associates an application to a corresponding protocol data unit (PDU) session for transmission based on a URSP policy, the specific mechanism is as follows:

When data appears in the application layer, the UE uses a URSP rule in the URSP policy to check whether a characteristic of the application data is matched to a Traffic Descriptor of a certain rule in the URSP rule. An order of checking is decided according to a precedence in the Traffic Descriptor in the URSP rule, that is, the terminal device checks a matching situation in turn based on a precedence order. When a URSP rule is matched, an RSD list under the URSP rule is used to perform binding of a PDU session.

When there is a URSP rule matched, the terminal device searches for a suitable PDU session according to a Precedence order in RSD, where the RSD with a high precedence is used preferentially. If a certain parameter in the RSD has one or more values, then the UE selects one value therefrom to combine with another parameter together to check whether the PDU session exists, if so, the application data is bound to the session for transmission; and if not, the UE triggers the establishment of the PDU session, and the UE reports an attribute parameter of a PDU session in an establishment request message. If the establishment of the session is successful, then the UE binds the application data to the session for transmission; if the establishment of the session is unsuccessful, then the terminal device checks whether the PDU session exists again (the above acts are looped) based on another parameter combination in the RSD or using a parameter combination in the RSD with a secondary precedence.

If no suitable PDU session can be found for binding according to the matched URSP rule, then the terminal device checks whether a TrafficDescriptor in a second preferential URSP rule can match the application data flow characteristic according to a Precedence order, and if matched, the process previously described is repeated.

We call the above process of finding a suitable PDU session for an application as "evaluation". After finding the suitable PDU session for binding, the UE will choose suitable time to update the binding.

Under different scenarios, policies used by a terminal device may be different. However, at present, there is no clear solution for how the terminal device determines a UE policy to be used and how to choose a rule by which a UE policy may be divided.

Therefore, a scenario of UE policy update (containing actively triggering, by the UE, a policy update request or actively triggering, by a network side PCF, UE policy update) is not clear, and it is needed to analyze and define that the network permits the UE to trigger a policy request message and the network side authorizes the UE to trigger the request message under a specific scenario.

An implementation of the present disclosure provides a method for determining a UE policy, which provides a solution for using the UE policy by a terminal device. As shown in FIG. 3, the method includes act S310.

In S310, the terminal device determines a UE policy used by the terminal device according to first information, wherein the first information includes at least one piece of following information: an area where the terminal device is located, a PLMN corresponding to a network where the terminal device registered or camped, and a usage duration of a UE policy.

Figure 4:
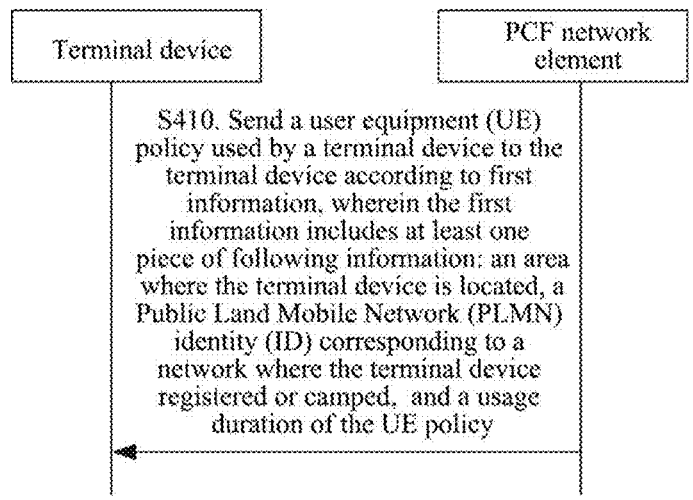
FIG. 4 is a schematic flow chart of a method for sending a policy according to an implementation of the present disclosure.

FIG. 4 is another method for sending a UE policy according to an implementation of the present disclosure. The method includes act S410.

In S410, a first network sends a UE policy used by a terminal device to the terminal device according to first information, wherein the first information includes at least one piece of following information: an area where the terminal device is located, a PLMN identity corresponding to a network where the terminal device registered or camped, and a usage duration of the UE policy.

The first network may refer to a PCF network element, or may refer to another core network element, such as an AMF network element or a session management function (SMF) network element.

The first network sends the UE policy used by the terminal device to the terminal device, which may refer to that the first network directly sends the UE policy used by the terminal device to the terminal device; or may refer to that the first network indirectly sends the UE policy used by the terminal device to the terminal device, for example, the PCF network element sends the UE policy used by the terminal device to the terminal device through another network element, such as the AMF network element.

The network where the terminal device registered or camped may represent a network where the terminal device registers or camps currently.

The network in which the terminal device registered represents a network in which the terminal device has performed a registration process, and both the network side and the terminal side have context information of the terminal device. The terminal device registering in the network may be in a connection management idle (CM-IDLE), a connection management connected state (CM-CONNECTED), or a radio resource control inactive state (RRC-INACTIVE).

The network where the terminal device camps may represent a network where the terminal device can receive a broadcast message and a paging message of a base station or a cell of the network and initiate an RRC connection establishment with the base station or the cell, but the terminal device has not yet established a connection with the base station or the cell.

For convenience of description, the UE policy used by the terminal device will be referred to as a target UE policy hereinafter.

The UE policy in the usage duration of the UE policy may refer to a UE policy used by the terminal device before the terminal device uses or determines the target UE policy.

The first network sends a UE policy to the terminal device, which may refer to that the first network sends a complete UE policy to the terminal device; or may refer to that the first network adds part of a UE policy on the basis of the UE policy previously used by the terminal device; or may refer to that the first network deletes part of the UE policy on the basis of the UE policy previously used by the terminal device; or, may refer to that the first network modifies part of the UE policy on the basis of the UE policy previously used by the terminal device.

The methods shown in FIG. 3 and FIG. 4 correspond to each other. For convenience of description, these methods will be described together below. Contents described below are applicable to both the methods shown in FIG. 3 and FIG. 4.

The UE policy may include at least one of following: a WLAN selection policy, a UE route selection policy, a vehicle to everything policy, and ANDSP.

For example, the first network may independently send one of a WLAN selection policy, a UE route selection policy, a vehicle to everything policy, and an access ANDSP to the terminal device. For another example, the first network may combine the WLAN selection policy and the UE route selection policy together and send them to the terminal device.

The vehicle to everything policy may include a policy which the terminal device needs to use in the vehicle to everything scenario.

The target UE policy may be understood as either a UE policy updated by the terminal device or a UE policy to be used by the terminal device.

The terminal device determines the target UE policy according to the first information, which may refer to that the terminal device determines the target UE policy to be used according to the first information.

The first network sends the target UE policy to the terminal device according to the first information, which may refer to that the first network determines the target UE policy to be used by the terminal device according to the first information, and sends the target UE policy to the terminal device.

For convenience of description, the PLMN corresponding to the network where the terminal device registered or camped will be referred to as the target PLMN, and the UE policy corresponding to the target PLMN will be the target UE policy.

Determining the target UE policy according to the first information may refer to determining the target UE policy according to a current area where the terminal device is located; or, it may refer to determining the target UE policy according to the target PLMN; or it may refer to determining the target UE policy according to the usage duration of the UE policy currently used by the terminal device. The UE policy currently used by the terminal device is a UE policy used by the terminal device before using the target UE policy.

Timing of determining the target UE policy is not specifically restricted in an implementation of the present disclosure. For example, when at least one of following situations occurs: the area where the terminal device is located is changed, the PLMN where the terminal device registered or camped is changed, and the duration of the UE policy currently used by the terminal device expires, the policy update is triggered, and the terminal device may use the target UE policy. That is to say, the terminal device may determine and use the updated target UE policy when the above situation occurs. For another example, the target UE policy may be used after a period of time when the above situation occurs.

It may be understood that when at least one of the above situations occurs, the UE policy used by the terminal device may be changed, so the terminal device needs to re-determine the target UE policy used.

An implementation of the present disclosure provides a clear method for determining a UE policy. For example, in an implementation of the present disclosure, a corresponding relationship is established between a UE policy and an area where a UE is located, and different areas may correspond to different UE policies. When a terminal device is in a different area, different UE policies may be used for communication. In an implementation of the present disclosure, a corresponding relationship is also established between the UE policy and the PLMN used by the UE, and different PLMNs may correspond to different UE policies. When the terminal device registered or camped in different PLMNs, different UE policies may be used for communication. In an implementation of the present disclosure, a usage duration is also set for each UE policy, and when the UE policy used by the terminal device reaches its corresponding usage duration, the policy may be updated.

Of course, the above first information may also be used in combination with each other. For example, the area where the UE is located and the PLMN used by the UE may be combined with each other, and a corresponding relationship between the UE policy and the area where the UE is located as well as the PLMN where the UE registered or camped may be established.

The mode for determining the target UE policy according to the first information will be described in detail below with reference to a specific implementation.

As an implementation mode, each UE policy corresponds to one usage duration. When the terminal device uses one UE policy, if the usage duration of the UE policy reaches a preconfigured usage duration of the policy, the terminal device re-acquires the UE policy. For example, when the terminal device receives UE policy 1 sent by the first network, the terminal device starts a timer corresponding to the UE policy 1, and after the timer expires, the terminal device re-acquires or determines the target UE policy.

Similarly, the first network may also send the target UE policy to the terminal device after the usage duration of the UE policy 1 expires. For example, a first timer may be set on a PCF network element, the first timer is a timer corresponding to the usage duration of the first UE policy, and the PCF network element may send the target UE policy to the terminal device after the first timer expires. The first timer may be started after the PCF network element sends the first UE policy to the terminal device, wherein the first UE policy is a UE policy sent by the PCF network element to the terminal device before sending the target UE policy. In response to sending the target UE policy to the terminal device, the PCF network element may restart the first timer.

The above description is based on that usage durations of all UE policies are the same, and both of them are a duration of the first timer, but implementations of the present disclosure are not limited to this. The usage durations corresponding to different UE policies may be the same or different.

As another implementation mode, the target UE policy may be determined according to the area where the terminal device is located. Division of the area where the terminal device is located is not specifically restricted in an implementation of the present disclosure.

The area where the UE is located in an implementation of the present disclosure may be divided according to an existing mode. For example, the area where the terminal device is located may be divided according to a cell; for another example, the area where the terminal device is located may also be divided according to a coverage area of the base station; for still another example, the area where the terminal device is located may also be divided according to a tracking area.

When the terminal device enters or leaves one cell, the terminal device may use different UE policies; or, when the terminal device enters or leaves a coverage area of one base station, the terminal device may use different UE policies; or, when the terminal device enters or leaves different tracking areas, the terminal device may use different UE policies.

Figure 5:
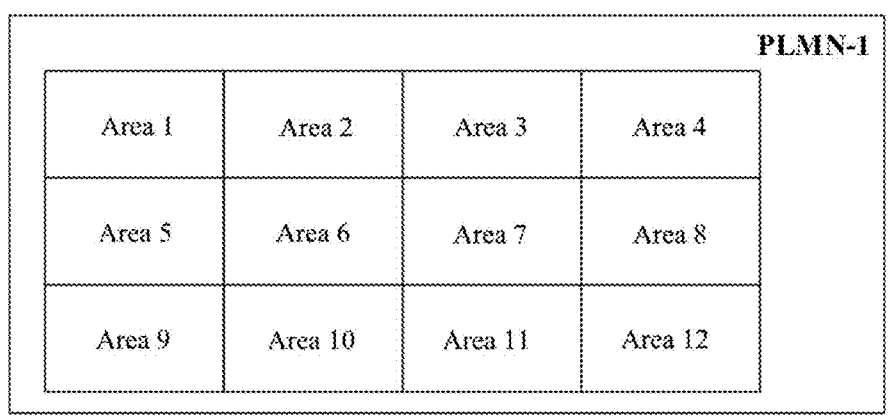
FIG. 5 is a schematic diagram of a policy area division mode according to an implementation of the present disclosure.

In an implementation of the present disclosure, the area where the terminal device is located may also be an area re-divided by the PCF network element. For example, the PCF network element may divide an area covered by one PLMN into at least one area, as shown in FIG. 5. Inside one PLMN, it may be divided into multiple areas, and UE policies corresponding to different areas are different. FIG. 5 shows a situation that one PLMN-1 is divided into 12 policy areas.

For convenience of description, in an implementation of the present disclosure, an area where a terminal device is located is referred to as a policy area, wherein the policy area is only a name defined for distinguishing another area, and does not limit an implementation of the present disclosure. The area where the terminal device is located may also be referred to as another area, such as a target area, etc., and this is not specifically restricted by an implementation of the present disclosure.

The area where the terminal device is located may be a policy area included in the PLMN where the terminal device registered or camped, and one PLMN may include at least one policy area. When the terminal device enters or leaves different policy areas, different UE policies may be used.

One policy area may include at least one cell, tracking area, or coverage area of a base station. When dividing policy areas, the PCF network element may divide at least one cell into one policy area, or may divide at least one tracking area into one policy area, or may divide at least one coverage area of a base station into one policy area.

The policy area may be indicated by a policy area identity, and different policy areas correspond to different policy area identities. The terminal device may determine whether the area where the terminal device is located changes through the policy area identity.

The policy area identity may be sent by the base station to the terminal device. For example, the terminal device may receive a first policy area identity from the base station, wherein the first policy area identity may be used for determining the area where the terminal device is located, and the first policy area identity includes at least one of following: an identity of the base station, a policy area identity corresponding to the base station, and a policy area identity corresponding to a cell where the terminal device is connected or camps.

The policy area identity corresponding to the base station may represent that the policy area identity belongs to the base station; and the policy area identity corresponding to a cell may represent that the policy area identity belongs to the cell.

The policy area identity corresponding to the base station may refer to a policy area identity corresponding to a policy area to which a coverage area of the base station belongs, and the policy area identity corresponding to the cell where the terminal device is connected or camps may refer to a policy area identity corresponding to a policy area to which the cell where the terminal device is connected or camps belongs.

Under a situation that the policy area is divided according to the coverage area of the base station, if a coverage area of one base station represents one policy area and coverage areas of different base stations represent different policy areas, then under the situation, the policy area identity may also be represented by the identity of the base station.

Under a situation that the policy area is divided according to cells, if one cell represents one policy area and different cells represent different policy areas, then under the situation, the policy area identity may also be represented by the identity of the cell.

Of course, the coverage area of one base station may also belong to multiple policy areas, that is, one policy area belongs to part of a coverage area of one base station; one cell may also belong to multiple policy areas, that is, one policy area belongs to part of the cell.

The terminal device determines whether the terminal device has left a current policy area or entered a new policy area according to a first policy area identity sent by the base station. For example, when the terminal device receives different policy area identities sent by a same base station twice, or when the terminal device receives different policy area identities sent by two base stations, then the terminal device may determine that a policy area where the terminal device is located has changed, then the terminal device may use different UE policies to communicate.

The base station sends the first policy area identity to the terminal device, it may be that, the base station broadcasts the first policy area identity to the terminal device through a system message, that is, the first policy area identity may be contained in a cell broadcast message of the base station. Under some situations, the base station may also send the first policy area identity to the terminal device through dedicated signaling.

As an implementation, when the policy area identity broadcast by the base station and received by the terminal device changes from the first policy area identity to a second policy area identity during a movement process of the terminal device, the terminal device may continue to use a UE policy corresponding to the first policy area identity, and at the same time, the terminal device may also actively request a UE policy corresponding to the second policy area identity from the first network. This mode can ensure continuity of service, and will not be affected by the terminal device due to the change of the policy area. When the terminal device receives the UE policy corresponding to the second policy area identity sent by the first network, the terminal device uses the UE policy corresponding to the second policy area identity.

The terminal device may receive at least one policy area identity and/or an area corresponding to each policy area identity sent by the first network, wherein the at least one policy area identity and/or the area corresponding to each policy area identity is used for determining an area where the terminal device is located.

After receiving at least one policy area identity and its corresponding area, the terminal device may independently judge whether the area where the terminal device is located has changed. The terminal device may determine the policy area identity corresponding to an area where the terminal device is currently located according to at least one policy area identity and its corresponding area. Assuming that the area corresponding to the policy area identity is described with a cell, if the terminal device detects that the policy area identity corresponding to Cell 1 where the terminal device is currently located is identity 1, the policy area identity corresponding to Cell 2 where the terminal device is previously located is identity 2, and the identity 1 and the identity 2 are different, then the terminal device may determine that the area where it is located has changed.

One policy area identity may correspond to one or more cells, tracking area list, or coverage areas of the base stations. When the policy area identities corresponding to the cell where the terminal device is located, the tracking area list, or the coverage area of the base station are different, the policy area where the terminal device is located has changed.

At least one policy area identity and/or the area corresponding to each policy area identity is sent to the terminal device by the first network through a message in a registration process and/or a message in a UE configuration update (UCU) process. For example, the first network may send the least one policy area identity and/or the area corresponding to each policy area identity to the terminal device through a registration request response message or a UE configuration update (UCU) command message.

Of course, an implementation of the present disclosure may not introduce a new ID to indicate the policy area. When sending the UE policy to the terminal device, the first network may directly inform the terminal device of the area corresponding to the sent UE policy. For example, when sending the UE policy to the terminal device, the first network may send the cell, the base station and/or the tracking area list corresponding to the UE policy to the terminal device together, so that the terminal device determines an applicable area of the received UE policy.

Similarly, the first network may send the target UE policy to the terminal device according to an area where the terminal device is currently located. The first network may subscribe the area information of the terminal device to another network element, such as an AMF network element, so as to determine the area where the terminal device is currently located, and then send the target UE policy to the terminal device according to the area where the terminal device is currently located.

As yet another implementation mode, since different PLMNs may correspond to different UE policies, the terminal device may request the target UE policy from the first network under a situation that the PLMN where the terminal device registered or camped changes.

A scenario where the PLMN changes is not specifically restricted in implementations of the present disclosure.

As an example, when the terminal device performs a cell handover, the PLMN corresponding to the network which is connected with the terminal device may change. When the terminal device performs a cell handover, a source base station may select one PLMN ID for the terminal device. The PLMN ID selected by the source base station may be different from the PLMN ID previously registered or camped by the terminal device. Therefore, the PLMN corresponding to the network where the terminal device registered or camped may change in a handover process of the terminal device from a source cell to a target cell.

In addition, when selecting a PLMN, the source base station may preferentially select a PLMN equivalent to the PLMN where the terminal device previously registered or camped, that is, the PLMN selected by the source base station and the PLMN where the terminal device previously registered or camped are equivalent PLMNs.

A cell handover of the terminal device may be a handover based on an Xn interface or a handover based on an N2 interface.

As another example, in a process that the terminal device enters a connected state from an idle state, the PLMN corresponding to the network to which the terminal device is connected may also change. In the process that the terminal device enters the connected state from the idle state, if the terminal device does not find the PLMN where the terminal device registered or camped previously, the terminal device may select another PLMN for connecting, in this situation, the PLMN where the terminal device registered or camped may change.

Under a condition that the terminal device does not find the PLMN where the terminal device registered or camped previously, it may select a PLMN equivalent to the PLMN where the terminal device registered or camped previously for connecting.

The terminal device may enter the connected state from the idle state through a registration process.

There are many modes for the terminal device to determine the target UE policy, and this is not specifically restricted in implementations of the present disclosure. For example, the terminal device may determine a UE policy corresponding to another PLMN as the target UE policy. For another example, the terminal device may also determine the target UE policy according to a previously stored or recorded UE policy. Yet for another example, the terminal device may determine the target UE policy by requesting from the first network. Description will be given below with reference to a specific implementation mode.

Generally, UE policies corresponding to equivalent PLMNs may be the same, so the terminal device may use a UE policy corresponding to an equivalent PLMN as the target UE policy.

The terminal device may use a UE policy corresponding to a PLMN equivalent to the target PLMN as the target UE policy. That is, if the terminal device obtains a UE policy corresponding to one PLMN in the equivalent PLMNs, the UE policy is used for all PLMNs in the equivalent PLMNs. For example, if the terminal device obtains the UE policy corresponding to PLMN-1, all PLMNs equivalent to PLMN-1 may use the UE policy.

That the equivalent PLMNs use the same UE policy may be specified in a protocol, or it is a default behavior of the terminal device, or it may be indicated to the terminal device by the first network, and this is not specifically restricted in implementations of the present disclosure. For example, the terminal device may receive first indication information sent by the first network, wherein the first indication information is used for indicating that the equivalent PLMNs have the same UE policy.

When determining the target UE policy, the terminal device may first determine a PLMN equivalent to the target PLMN, and then use the UE policy corresponding to the equivalent PLMN as the target UE policy.

If the first network sends the first indication information to the terminal device, the terminal device may determine which PLMNs and the target PLMN are equivalent PLMNs according to the first indication information and the target PLMN after receiving the first indication information. If the terminal device determines that a first PLMN and the target PLMN are equivalent PLMNs, the terminal device may use the UE policy corresponding to the first PLMN as the target UE policy.

If UE policies corresponding to multiple equivalent PLMNs are recorded or stored in the terminal device, the terminal device may use a UE policy last updated as the target UE policy. In other words, the terminal device may use the UE policy corresponding to the first PLMN as the target UE policy, and the UE policy corresponding to the first PLMN is a UE policy last updated corresponding to a PLMN equivalent to the PLMN where the terminal device registered or camped. Or, if UE policies corresponding to multiple equivalent PLMNs are recorded or stored in the terminal device, the terminal device may use a UE policy corresponding to the PLMN with a higher precedence in the multiple equivalent PLMNs as the target UE policy.

The equivalent PLMN may be sent by a core network to the terminal device, and the terminal device may determine a PLMN equivalent to the target PLMN according to the equivalent PLMN sent by the core network. A core network device may send a list of equivalent PLMNs of a PLMN currently registered (a target PLMN) to the terminal device. After receiving the list of PLMNs, the terminal device combines the list of PLMNs with the PLMN where the terminal device currently registers to obtain a final list of equivalent PLMNs. For example, the terminal device currently registers with PLMN-a, and the core network device sends a list of PLMNs equivalent to PLMN-a to the terminal device in the registration response message, wherein the 1st of PLMNs includes PLMN-b, PLMN-c and PLMN-d. Then the terminal device may add PLMN-a to the list to form a final list of equivalent PLMNs, wherein the final formed list of equivalent PLMNs includes PLMN-a, PLMN-b, PLMN-c and PLMN-d.

In each registration process, the terminal device may update (including adding, replacing and deleting) the stored list of equivalent PLMNs according to a received list of equivalent PLMNs and a PLMN currently registered.

The core network may also send a precedence of an equivalent PLMN to the terminal device. When determining the target UE policy, the terminal device may use a UE policy corresponding to a PLMN with a higher precedence as the target UE policy.

By way of illustration, the PLMN where the terminal device currently registers or camps is PLMN-1, and PLMN-2 and PLMN-3 equivalent to PLMN-1 are recorded or stored in the terminal device, wherein a UE policy corresponding to PLMN-2 is Policy 2, and a UE policy corresponding to PLMN-3 is Policy 3. In the Policy 2 and the Policy 3, if the Policy 3 is a policy last updated by the terminal device or the Policy 3 is a policy last received by the terminal device, then the terminal device may use the Policy 3 as a UE policy corresponding to PLMN-1. In the Policy 2 and the Policy 3, if a precedence of PLMN-2 is higher, then the terminal device may also use the Policy 2 as the UE policy corresponding to PLMN-1.

The terminal device determines the UE policy corresponding to the first PLMN as the target UE policy, which may include: the terminal device uses the UE policy corresponding to the first PLMN as the target UE policy under a situation that the terminal device has no UE policy corresponding to the target PLMN and/or the UE policy corresponding to the first PLMN is the UE policy last updated.

If there is a UE policy corresponding to the target PLMN in the terminal device, the terminal device may use the UE policy corresponding to the target PLMN as the target UE policy. If there is no UE policy corresponding to the target PLMN in the terminal device, the terminal device may determine the UE policy corresponding to the first PLMN as the target UE policy. If the UE policy corresponding to the first PLMN is the UE policy last updated, the terminal device may use the UE policy corresponding to the first PLMN as the target UE policy. If there is no UE policy corresponding to the target PLMN in the terminal device, and the UE policy corresponding to the first PLMN is the UE policy last updated, then the terminal device may use the UE policy corresponding to the first PLMN as the target UE policy.

In an optional mode, Mode 1, the terminal device receives terminal policy information sent by the network device, the terminal policy information includes the UE policy corresponding to the first PLMN and the UE policy corresponding to the third PLMN, wherein the first PLMN and the third PLMN are equivalent PLMNs, and the terminal device may store or associate the UE policy corresponding to the PLMN equivalent to the first PLMN as the UE policy corresponding to the first PLMN. When moving from the first PLMN to another target PLMN (the other target PLMN is an equivalent PLMN of the first PLMN), the terminal device may use the UE policy corresponding to the first PLMN.

Figure 6:
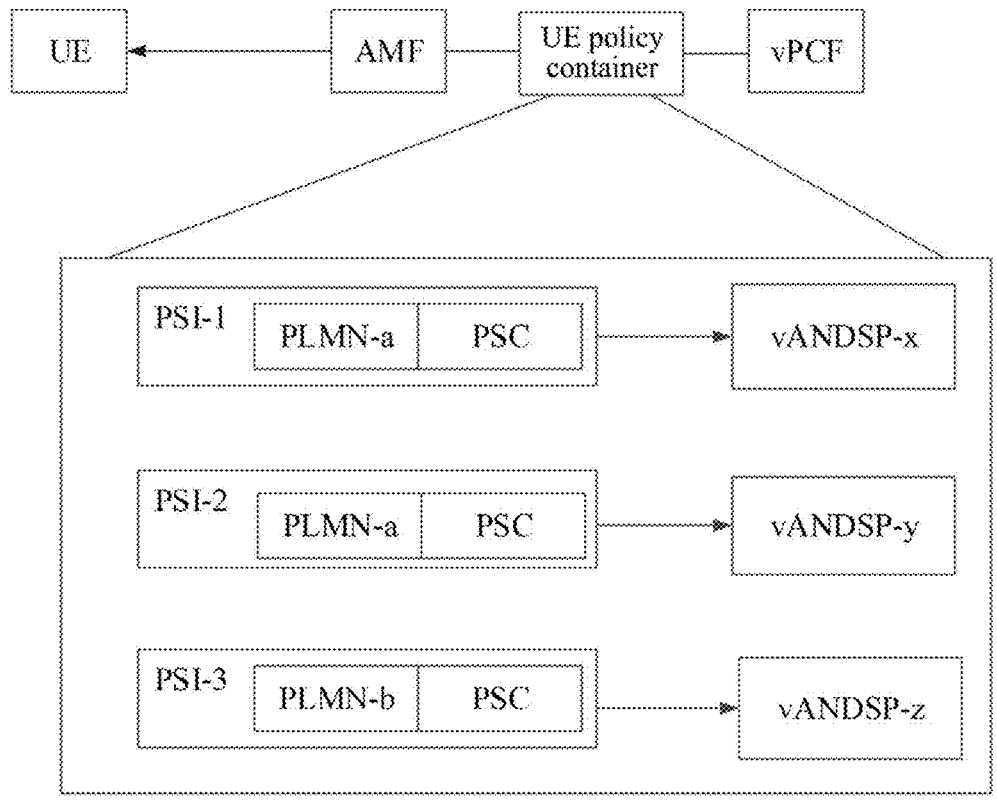
FIG. 6 is a schematic diagram of a UE policy sent by a network device according to an implementation of the present disclosure.

For example, if UE policies corresponding to multiple PLMNs are contained in the UE policies last updated, the terminal device uses the UE policy corresponding to the PLMN currently registered. For example, as shown in FIG. 6 below, assuming that the terminal device is in a roaming scenario, if the terminal device registered or camped in PLMN-a, that is, when a resisted PLMN (RPLMN)=PLMN-a, a visiting PCF (vPCF) sends the UE policy containing a visiting ANDSP (vANDSP) to the terminal device, wherein UE policies of PLMN-a and PLMN-b are included, and a list of equivalent PLMNs (EPLMNs) obtained by the terminal device is PLMN-a, PLMN-b, PLMN-c and PLMN-d. The terminal device may apply the policy corresponding to the registered PLMN-a to another equivalent PLMN. That is, when the terminal device moves to PLMN-b, PLMN-c or PLMN-d equivalent to PLMN-a, the UE policy corresponding to PLMN-a, i.e., vANDSP-x and vANDSP-y in the figure, may still be used.

The terminal device may use contents in vANDSP-x and vANDSP-y according to a precedence order of policy rules when using vANDSP-x and vANDSP-y.

The network side may divide the UE policy into one or more parts to send to the terminal device, wherein each part is identified by one policy section identifier (PSI). The PLMN ID may be carried by a policy section identifier (PSI), and a corresponding relationship between the PSI and the UE policy content indicates a corresponding relationship between the PLMN ID and the UE policy content.

In addition, when the terminal device receives the UE policies corresponding to PLMN-a and PLMN-b, the terminal device may store or associate the UE policies corresponding to PLMN-a, PLMN-b, PLMN-c and PLMN-d as the UE policy corresponding to PLMN-a.

In another optional mode, Mode 2, the terminal device receives terminal policy information sent by the network device, the terminal policy information includes the UE policy corresponding to the first PLMN and the UE policy corresponding to the third PLMN, wherein the first PLMN and the third PLMN are equivalent PLMNs, and the terminal device may store or associate a UE policy corresponding to a PLMN, except the third PLMN, equivalent to the first PLMN as the UE policy corresponding to the first PLMN. When moving from the first PLMN to another target PLMN (the other target PLMN is an equivalent PLMN of the first PLMN but is not the third PLMN), the terminal device may use the UE policy corresponding to the first PLMN.

For example, as for FIG. 6, under a situation that the terminal device registered with PLMN-a, a UE policy corresponding to PLMN-a (RPLMN) (containing UE policies of vANDSP-x and vANDSP-y) and a UE policy corresponding to PLMN-b (a vANDSP-z policy) are obtained, therefore both of them are UE policies last updated. The list of equivalent PLMNs obtained by the terminal device is PLMN-a, PLMN-b, PLMN-c and PLMN-d, so the terminal device may use the UE policy corresponding to PLMN-a for another PLMN, except PLMN-b, equivalent to PLMN-a, and PLMN-b independently corresponds to its own UE policy. In other words, if the terminal device moves to PLMN-c or PLMN-d, the UE policy corresponding to PLMN-a is used; and if the terminal device moves to PLMN-b, the UE policy corresponding to PLMN-b itself is used.

Figure 7:
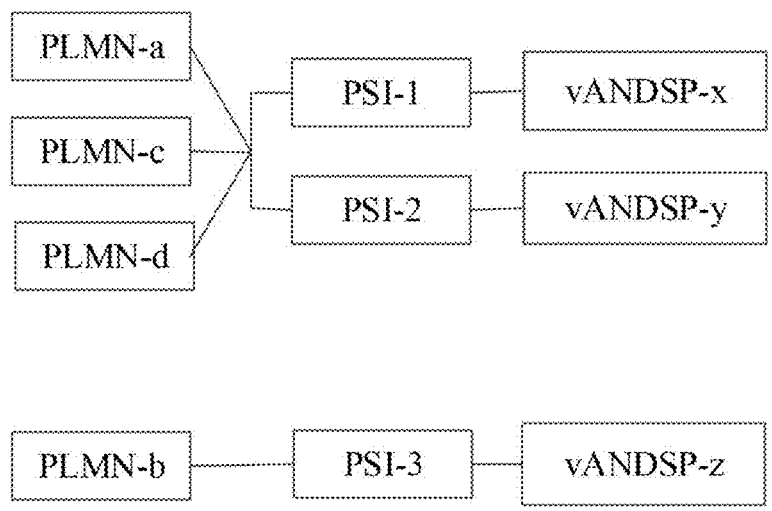
FIG. 7 is a schematic diagram of a mode in which a terminal device stores a UE policy according to an implementation of the present disclosure.
Figure 8:
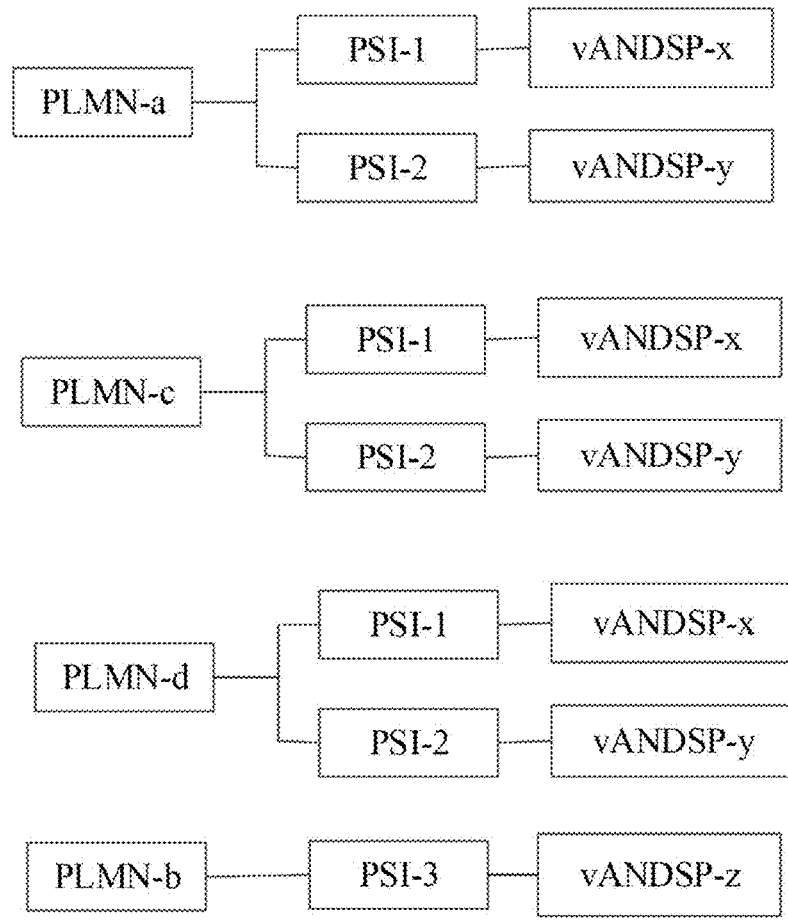
FIG. 8 is a schematic diagram of another mode in which a terminal device stores a UE policy according to an implementation of the present disclosure.

In addition, when the terminal device receives the UE policies corresponding to PLMN-a and PLMN-b, the terminal device may store or associate the UE policies corresponding to PLMN-a, PLMN-c and PLMN-d as the UE policy corresponding to PLMN-a, while store or associate the UE policy corresponding to PLMN-b as the received UE policy corresponding to PLMN-b. A specific storage relationship may be shown in FIG. 7 and FIG. 8. FIG. 7 and FIG. 8 respectively describe a corresponding relationship between each PLMN in a list of equivalent PLMNs stored by a terminal device and a UE policy.

The terminal device may perform a behavior in the above Mode 1 or Mode 2 under at least one of following situations: the PLMN where the terminal device registered or camped changes, the terminal device receives a UE policy from the PLMN where the terminal device registered or camped, the terminal device receives a list of equivalent PLMNs, an updated list of equivalent PLMNs, the stored list of equivalent PLMNs changes (the updated list of equivalent PLMNs and a last stored list of equivalent PLMNs are different), and a preset time condition is met. Specifically, the terminal device may determine the UE policy corresponding to each PLMN in the list of equivalent PLMNs or store the UE policy corresponding to each PLMN in the list of equivalent PLMNs under at least one of the above situations.

After the terminal device performs Mode 1 or Mode 2, each PLMN in the previous list of equivalent PLMNs and its corresponding UE policy relationship may be deleted, or the previous corresponding relationship may still be kept. For example, the terminal device stores each PLMN in a list-1 of equivalent PLMNs and its corresponding UE policy relationship in China, and then the terminal device updates each PLMN in a list-2 of equivalent PLMNs and its corresponding UE policy relationship in Japan. In this situation, the terminal device may still store the corresponding relationship previously stored in China for subsequently continuing to use when returning to China. If the terminal deletes, in Japan, the update relationship stored in China, it may also help to reduce the workload of the terminal.

The updated list of equivalent PLMNs may be determined by the terminal device according to the list of PLMNs sent by the core network and the PLMN where the terminal device registered. That is, the updated list of PLMNs includes PLMNs in the list of PLMNs sent by the core network and the PLMN where the terminal device registered.

Optionally, that the PLMN where the terminal device registered or camped changes may mean that the terminal device has moved from one PLMN to another PLMN, and the UE policy corresponding to the PLMN after moving is different from the UE policy corresponding to the PLMN before moving.

Information of equivalent PLMNs (e.g., a list of equivalent PLMNs) may be sent by the network side to the terminal device through a downlink NAS message, for example, in the registration process, the core network element sends the information to the terminal device through a registration request response message.

The UE policy corresponding to the PLMN equivalent to the first PLMN may be stored by the terminal device under at least one of following situations: the terminal device determines the UE policy corresponding to the PLMN equivalent to the first PLMN, and the terminal device moves to a new PLMN.

The terminal device may determine the UE policy corresponding to the PLMN equivalent to the first PLMN according to the above Mode 1 or Mode 2. When the terminal device determines the UE policy corresponding to each PLMN, it may immediately store the corresponding relationship between the PLMN and the UE policy, that is, store the PLMN ID and a corresponding UE policy content, or it may store the relationship later, for example, store the relationship when moving to a new PLMN. The storage form may be that the terminal device associates multiple PLMN IDs with a same UE policy content, as shown in FIG. 7, or it may be that the terminal device duplicates a same UE policy content to get multiple copies, and then associates each UE policy with each PLMN ID, as shown in FIG. 8.

For example, when the terminal device registered in PLMN-a, it moves to an equivalent PLMN of PLMN-a at a subsequent time point. In the situation of Mode 1, the terminal device may continue to apply the UE policy corresponding to PLMN-a to another equivalent PLMN. Or in the situation of Mode 2, assuming that PLMN-b becomes RPLMN, the terminal device may apply the UE policy corresponding to PLMN-b to another PLMN, except PLMN-a, equivalent to PLMN-b, while the UE policy corresponding to PLMN-a itself is applied to PLMN-a, that is, after the terminal device moves from PLMN-a to PLMN-b, the terminal device may store or associate the UE policies corresponding to PLMN-c and PLMN-d as the UE policy corresponding to PLMN-b.

For another example, when the terminal device receives the list of equivalent PLMNs sent by the network device, the terminal device may store the UE policy corresponding to the equivalent PLMN according to the above Mode 1 or Mode 2. For example, as long as the terminal device receives the list of equivalent PLMNs, it performs the behaviors in Mode 1 or Mode 2, such as storing the UE policy corresponding to each PLMN in the list of equivalent PLMNs or determining the UE policy corresponding to each PLMN in the list of equivalent PLMNs. For another example, after receiving a list of equivalent PLMNs, the terminal device judges whether the received list of equivalent PLMNs (including considering RPLMN) is the same as the previously stored list of equivalent PLMNs. If the received list of equivalent PLMNs is the same as the previously (e.g., last) stored list of equivalent PLMNs, the terminal device may not perform the above behaviors in Mode 1 or Mode 2. If the received list of equivalent PLMNs is different from the previously stored list of equivalent PLMNs, the terminal device performs the above behaviors in Mode 1 or Mode 2.

Optionally, the above description is made by taking the terminal device in the roaming scenario as an example. If the terminal device receives the UE policy sent by the vPCF in the roaming scenario, and also receives the UE policy sent by a home PCF (hPCF), the terminal device may preferentially use the UE policy sent by the vPCF. If the UE policy sent by the vPCF cannot be used, the terminal device may use the UE policy sent by the hPCF.

The policy section code (PSC) in FIG. 6 may be used for identifying different parts of the UE policy within one PLMN.

The equivalent PLMN may come from the core network. For example, in a terminal registration process, the core network element AMF sends the equivalent PLMN and/or the precedence of the equivalent PLMN to the terminal device and/or the base station. In this way, in a cell handover process, the source base station may select a PLMN for the terminal device according to the equivalent PLMN and/or the precedence of the equivalent PLMN sent by the core network. Or, in the process that the terminal device enters the connected state from the idle state, the terminal device may select the PLMN to be registered or camped according to the equivalent PLMN and/or the precedence of the equivalent PLMN sent by the core network.

If the core network configures precedence information of the equivalent PLMN to the terminal device, the terminal device may select a PLMN with a higher precedence for registration when selecting a PLMN. Similarly, in the cell handover process, the base station may also select a PLMN with a higher precedence for the terminal device. Of course, implementations of the present disclosure are not limited to this. The base station may select any equivalent PLMN for the terminal device, and the terminal device may also select any equivalent PLMN for registration.

The registration area is composed of multiple TAIs (i.e., a TAI list). A 5G network usually use the term "registration area", while a 4G network usually use the term TAI list. Generally, the terminal does not need to initiate a location update request when moving within the registration area, but needs to initiate a location update request when moving out of the registration area.

One TAI may include one PLMN ID and a TAC, for example, TAI=PLMN ID+TAC.

PLMNs within a same registration area or a TAI list area may correspond to a same UE policy.

Optionally, when the terminal device obtains the UE policy from the network side, the terminal device may consider that all PLMN IDs contained in the TAIs in the TAI list or a registration area currently correspond to the UE policy.

For example, the terminal device may determine the UE policy corresponding to the first PLMN as the target UE policy, wherein the first PLMN and the target PLMN are PLMNs contained within a same registration area or TAI list area.

For example, a Registration Area includes TAI-1 and TAI-2, TAI-1 includes PLMN-1 and TAC-2, and TAI-2 includes PLMN-2 and TAC-2. When the terminal device obtains a UE policy from the first network, the terminal device may consider that the UE policy is applicable to both PLMN-1 and PLMN-2.

Optionally, when the PLMN where the UE currently registers or camps does not have a corresponding UE policy, the UE may use the UE policy corresponding to another PLMN ID contained in the TAI in the TAI list or the registration area.

Optionally, the UE may use the last updated policy among the policies corresponding to all PLMN IDs contained in the TAI in the TAI list table or the registration area received. If there are multiple last updated policies and the policy corresponding to the PLMN where the UE registers or camps currently is also the last updated policy, the policy corresponding to the PLMN where the UE registers or camps currently is used.

Optionally, when the UE moves within the TAI list area, it still uses the policy corresponding to the previous PLMN when moving to a TAI corresponding to a different PLMN. For example, when the terminal device moves from TAI1 (PLMN-1+TAC-1) to TAI2 (PLMN-2+TAC-2), it may still use the policy corresponding to PLMN-1.

The PLMN contained in the same registration area or TAI list area uses the same UE policy, and it may be specified in a protocol, or may be a default behavior of the terminal device, or may be indicated by the first network to the terminal device.

The first network may also indicate to the terminal device which PLMNs have the same UE policy as the terminal device, and the indication mode is not specifically restricted in an implementation of the present disclosure.

As an optional implementation mode, the terminal device may receive the UE policy corresponding to the first PLMN, and store or associate the UE policy corresponding to the second PLMN as the UE policy corresponding to the first PLMN.

Herein, the second PLMN and the first PLMN are equivalent PLMNs, and/or the second PLMN and the first PLMN are PLMNs corresponding to TAI identities contained in the same registration area or TAI list received by the terminal device.

For example, if the second PLMN and the first PLMN are equivalent PLMNs, assuming that the UE policy corresponding to the first PLMN is UE policy 1, the terminal device may store or associate the UE policy corresponding to the second PLMN as the UE policy 1 after receiving the UE policy 1. In other words, the terminal device may update the UE policy corresponding to the second PLMN to the UE policy 1.

For another example, if the second PLMN and the first PLMN are the PLMNs corresponding to the TAI identities contained in the same registration area or TAI list, the terminal device may store or associate the UE policy corresponding to the second PLMN as the UE policy 1 after receiving the UE policy 1 corresponding to the first PLMN. In other words, the terminal device may update the UE policy corresponding to the second PLMN to the UE policy 1.

If the terminal device stores the UE policy corresponding to the second PLMN before receiving the UE policy corresponding to the first PLMN, the terminal device may delete the previously stored UE policy corresponding to the second PLMN. For example, if the terminal device stores the UE policy 2 corresponding to the second PLMN, the terminal device may delete the previously stored UE policy 2 corresponding to the second PLMN after receiving the UE policy 1 corresponding to the first PLMN, and store or associate the UE policy corresponding to the second PLMN as the UE policy 1.

The terminal device may also receive second indication information sent by the first network, wherein the second indication information is used for indicating an ID list of PLMNs with a same UE policy. PLMNs in the list of PLMNs may or may not be equivalent PLMNs.

After receiving the second indication information, the terminal device may determine which PLMN has a same UE policy as the target PLMN according to the second indication information and the target PLMN. If the terminal device determines that the third PLMN has the same UE policy as the target PLMN, the terminal device may use the UE policy corresponding to the third PLMN as the target UE policy.

If the terminal device determines that there are multiple PLMNs with the same UE policy as the PLMN where the terminal device currently registers or camps, the terminal device may select one PLMN randomly from the multiple PLMNs, and use the UE policy corresponding to the PLMN as the target UE policy. Or if the network device also configures precedences of the multiple PLMNs, then the terminal device may select the UE policy corresponding to the PLMN with a higher precedence as the target UE policy. Or the terminal device may select the last updated UE policy as the target UE policy in the UE policies corresponding to the multiple PLMNs.

The terminal device determines the UE policy corresponding to the third PLMN as the target UE policy, which may include: the terminal device uses the UE policy corresponding to the third PLMN as the target UE policy under a situation that there is no UE policy corresponding to the target PLMN and/or the UE policy corresponding to the third PLMN is the UE policy last updated.

If there is a UE policy corresponding to the target PLMN in the terminal device, the terminal device may use the UE policy corresponding to the target PLMN as the target UE policy. If there is no UE policy corresponding to the target PLMN in the terminal device, the terminal device may determine the UE policy corresponding to the third PLMN as the target UE policy. If the UE policy corresponding to the third PLMN is the UE policy last updated, the terminal device may use the UE policy corresponding to the third PLMN as the target UE policy. If there is no UE policy corresponding to the target PLMN in the terminal device, and the UE policy corresponding to the third PLMN is the UE policy last updated, then the terminal device may use the UE policy corresponding to the third PLMN as the target UE policy.

Of course, when the terminal device determines the target UE policy, it may also determine the target UE policy in combination with the above modes. For example, if the core network sends the list of equivalent PLMNs to the terminal device, and multiple PLMNs are contained in the same registration area or TAI list area, the terminal device may determine the UE policy corresponding to the PLMN which is equivalent to the target PLMN and belongs to the same registration area or TAI list area as the target PLMN as the target UE policy when determining the target UE policy.

The above various usage scenarios where multiple PLMNs correspond to a same UE policy may be: if an allowed S-NSSAI corresponding to one PLMN issued by the network side used by the terminal device is also applicable to the network slice information for an equivalent PLMN of the PLMN, another PLMN contained in a TAI of a registration area or a TAI list area, or other specified multiple PLMNs, then usage of a UE policy may also follow a policy similar to the policy that is shared by an Allowed NSSAI on multiple PLMNs. In this way, behavior unity of the terminal device within a certain area or under a condition may be ensured, and it may also be guaranteed that service continuity may not be affected by the change of the terminal device due to the PLMN.

The terminal device may also determine the target UE policy according to the previously stored UE policy in combination with the current first information of the terminal device. If the first information includes an area where the terminal device is located, and the terminal device stores UE policies corresponding to different areas, when the area where the terminal device is located changes, the terminal device may use the stored UE policy corresponding to the area where the terminal device is currently located as the target UE policy.

The terminal device stores UE policies, which may mean that the terminal device stores previously used UE policies. Every time the terminal device updates the policies, it stores the previously used UE policies and their corresponding UE policies, so that if the terminal device has the same first information again, it may use the previously stored UE policies. The terminal device stores UE policies, which may also mean that the first network may send multiple UE policies and their corresponding first information to the terminal device at one time, and the terminal device stores the multiple UE policies and their corresponding first information for later use.

As another example, the terminal device may also request the target UE policy from the first network, and the first network may send the target UE policy to the terminal device based on the request of the terminal device. Under a situation that the terminal device determines that the UE policy needs to be updated according to the above first information, it may send a first request message to the first network to request the target UE policy; and the terminal device receives a target UE policy sent by the first network. After receiving the target UE policy sent by the first network, the terminal device may use the target UE policy for communication.

The first network sends the target UE policy to the terminal device, which may mean that the first network only sends the target UE policy currently required by the terminal device to the terminal device, under this situation, the terminal device may directly use the target UE policy; or may mean that the first network sends multiple UE policies to the terminal device, wherein the multiple UE policies include the target UE policy. For example, the first network may send multiple UE policies and their corresponding areas to the terminal device, and the terminal device may determine the target UE policy according to the multiple UE policies and their corresponding areas in combination with the area where it is currently located.

The terminal device sends the first request message to the first network according to the first information, which may include: the terminal device sends a first request message to the first network in response to at least one of following situations: the area where the terminal device is located changes, the PLMN where the terminal device registered or camped changes, and a usage duration of the UE policy used by the terminal device expires.

For example, under a situation that the area where the terminal device is located changes, the terminal device may send the first request message to the first network to request a target UE policy, wherein the target UE policy is a UE policy corresponding to the changed area of the terminal device. For another example, under a situation that the PLMN where the terminal device registered or camped changes, the terminal device may send the first request message to the first network to request a target UE policy, wherein the target UE policy is a UE policy corresponding to the changed PLMN of the terminal device. For still another example, the terminal device may send the first request message to the first network to request the target UE policy after a delay duration of the used UE policy expires.

The first request message may include at least one piece of following information: the area information of the terminal device, an identity of the PLMN corresponding to the network where the terminal device registered or camped, and the policy identifier.

The area information of the terminal device may also be understood as location information of the terminal device, so that the first network may send the target UE policy to the terminal device according to a current location of the terminal device. The area information of the terminal device may include information of an area where the terminal device leaves and/or information of an area where the terminal device enters.

The area information of the terminal device may include information of a cell, a base station, a tracking area and/or a policy area, specifically, the area information of the terminal device may include a cell ID, a base station ID, a tracking area ID and/or a policy area identity. For example, the area information of the terminal device may include an ID of the area where the terminal device leaves and/or an ID of the area where the terminal device enters.

The area information of the terminal device may include the information of the area where the terminal device enters, and the first network may send a target UE policy corresponding to a current area to the terminal device according to an area where the terminal device currently enters.

If a running track of the terminal device is relatively fixed, for example, a terminal device on a high-speed rail, the terminal device may only report a leaving area to the first network, and the first network may determine an area where the terminal device is currently located according to the area where the terminal device leaves, and then send a target UE policy corresponding to the current area to the terminal device.

The first request message may also include a PLMN ID, the PLMN ID may be a PLMN ID corresponding to the PLMN where the terminal device currently registers or camps, and the PLMN ID may be used by the first network to send the target UE policy corresponding to the current PLMN to the terminal device according to the PLMN where the terminal device registered or camped.

A policy identifier represents an identifier corresponding to the UE policy, one UE policy may correspond to one policy identifier, or one UE policy may also correspond to multiple policy identifiers. For example, the first network may divide one UE policy into one or more partial policies, and send the one or more partial policies to the terminal device. Herein, each part may correspond to one identifier, under this situation the policy identifier may be a policy section identifier.

As an example, the first network may divide a WLAN selection policy and a UE routing policy into multiple parts, wherein each part corresponds to one policy section identifier, and the first network may send the multiple policy section identifiers and their corresponding policies to the terminal device.

The policy identifier may be used for indicating at least one piece of following information: a PLMN ID corresponding to a network to which the terminal device is connected, a PLMN ID corresponding to a home of the terminal device, and a PLMN ID corresponding to a visited place of the terminal device.

The policy identifier may only indicate a PLMN ID corresponding to a network to which the terminal device is currently connected. If the terminal device is in a roaming scenario, selecting the policy identifier may indicate the PLMN ID corresponding to the home of the terminal device and the PLMN ID corresponding to the visited place of the terminal device.

The first request message may be a registration request message and/or a UE policy configuration request message. The terminal device may request the target UE policy from the first network through the registration process, or the terminal device may directly send the UE policy configuration request message to the first network to request the target UE policy. These two processes are described in detail below.

When the UE policy needs to be updated, the terminal device may send a registration request message to the first network, wherein the registration request message may carry information such as the policy identifier, the area information of the terminal device, and/or the PLMN ID of the terminal device. The terminal device may add the policy identifier, the area information of the terminal device, and/or the PLMN ID of the terminal device into a container, and send the container to the AMF network element through a non-access stratum (NAS), and the AMF network element may forward the container to the PCF network element. The PCF network element may send the target UE policy to the terminal device according to the information such as the policy identifier, the area information of the terminal device, and/or the PLMN ID of the terminal device.

When PCF sends the target UE policy to the terminal device, it may add the target UE policy into the container, and send the container to AMF network element. After receiving the container, the AMF network element forwards the container carrying the target UE policy to the terminal device.

Figure 9:
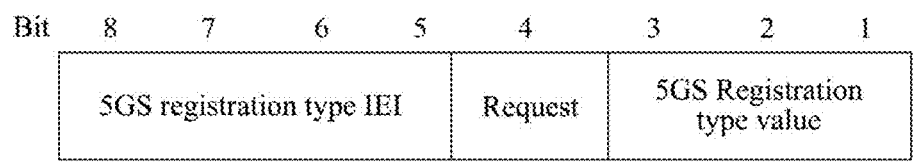
FIG. 9 is a structural diagram of a registration request message according to an implementation of the present disclosure.

The structure of the registration request message may be as shown in FIG. 9. The registration request message may include three parts, one part is a registration type information element (IEI) field of a 5G system (5GS), one part is a "for" field, and the other part is a 5GS registration type value.

Herein, the 5GS registration type value is indicated by bits 1, 2 and 3. A specific content may be shown in Table 3.

TABLE 3

| Bits 3 2 1 | Registration request type |
|---|---|
| 0 0 1 | Initial registration |
| 0 1 0 | Mobility registration updating |
| 0 1 1 | Periodic registration updating |
| 1 0 0 | Emergency registration |
| 1 1 1 | Reserved bit |

Bit 4 is a request (for) bit, and a specific content may be shown in Table 4.

TABLE 4

| Bit 4 | Request type |
|---|---|
| 0 | No follow-on request pending |
| 1 | Follow-on request pending |

In an implementation of the present disclosure, bits in the registration request message may be reused to indicate that the type of the registration request message is UE policy update. For example, the registration request message includes a first parameter value, wherein the first parameter value is used for indicating that the registration request message is used for UE policy update.

The implementation of the present disclosure does not specifically limit the bits occupied by the first parameter value. For example, one bit may be used for indicating the first parameter value, or three bits may be used for indicating the first parameter value, or four bits may be used for indicating the first parameter value.

Assuming that the first parameter value is indicated by using 3 bits, then first 3 bits in the registration request message may be used for indicating the first parameter value. Referring to the content in Table 1, the first parameter value may be 110 or 111, that is, 110 or 111 may be used for indicating that the type of the registration request message is UE policy update.

Assuming that the first parameter value is indicated by using 4 bits, then first 4 bits in the registration request message may be used for indicating the first parameter value. For example, the first parameter value may be 1111 or another value.

Referring to FIG. 9, the registration request message may include a registration type value, and the first parameter value is one of registration type values. Referring to Table 1, 3 bits may be used for indicating the registration type value. When a value of the 3 bits is a specific value, it may represent that the registration request message is a message for requesting UE policy update.

When UE policy update is needed, the terminal device may send a registration request message to the AMF network element, and add the first parameter value to the registration request message. After receiving the type of registration request message, the AMF network element may send the container in the registration request message to the PCF network element for the PCF network element to perform policy update.

At least one of the first information, the first indication information, the second information and the second indication information in an implementation of the present disclosure may be sent by the PCF to the AMF through a container, and then the AMF carries the container in a downlink NAS message to send to the terminal device.

Figure 10:
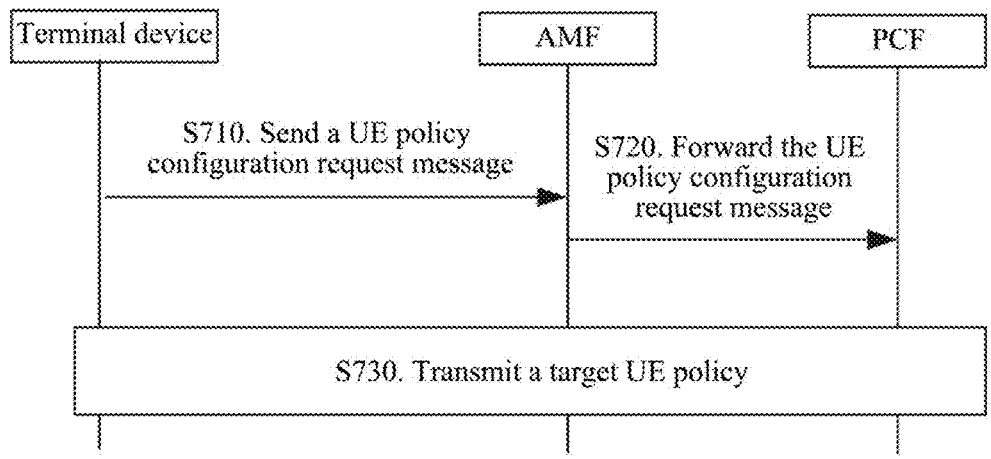
FIG. 10 is a schematic flow chart of a method for actively requesting a UE policy by a terminal device according to an implementation of the present disclosure.

The terminal device may also request the target UE policy from the first network through the policy configuration request message. A specific request process may be as shown in FIG. 10, which is characterized in that the terminal device may send a request message to the network side, and then the network side may trigger the process described in FIG. 10 to complete configuration of a UE policy. The method shown in FIG. 10 includes acts S710-S730.

In S710, a terminal device sends a UE policy configuration request message to an AMF network element.

In S720, the AMF network element forwards the UE policy configuration request message to a PCF network element.

In S730, a target UE policy is transmitted. Transmitting the target UE policy may include that the PCF network element sends the target UE policy to the terminal device.

At present, the method shown in FIG. 10 is only applicable to the UE policy request of V2X service. An implementation of the present disclosure applies the process to all common UE policy request scenarios. If a UE policy in the terminal device expires, is lost or is invalid, the terminal device may actively send the UE policy configuration request message to the PCF network element.

In a process of policy update, the terminal device may also store at least one piece of second information and its corresponding UE policy, wherein the second information includes a policy area identity and/or a PLMN identity. For example, the terminal device may store different policy areas and their corresponding UE policies. For another example, the terminal device may also store different PLMN and their corresponding UE policies.

In addition, an implementation of the present disclosure may also set a first preset value for the second information and/or the UE policy stored by the terminal device. If a quantity of pieces of the second information and/or the UE policies stored in the terminal device reaches the first preset value, the terminal device may delete the previously stored second information and/or UE policy/policies, thereby the quantity of the UE policies stored in the terminal device can be reduced.

The first preset value may be configured locally by the terminal device, or configured by a network device to the terminal device.

The policy area is taken as an example for illustration. The terminal device may store a UE policy/policies corresponding to one or more policy areas. When the terminal device moves from Area 1 to Area 2, the terminal device obtains the UE policies corresponding to the Area 2, and uses the UE policy corresponding to the Area 2 for communication. At this time, the terminal device may still save the UE policy corresponding to the previous Area 1. When a quantity of areas and/or UE policies stored by the terminal device reaches an upper limit value, the terminal device may delete a previously stored UE policy, for example, the terminal device may delete the earliest stored UE policy or any stored UE policy.

A presence reporting area (PRA) is a kind of area information used by the core network to sense a location of the terminal device, which is described by one or more Tracking Areas (TAs), base station IDs and/or cell IDs. Since the TA, the base station ID and/or the cell ID corresponding to the terminal device will be changed when the base station is switched, these changes will be reported to the core network device, e.g., reported to the AMF network element. It is very easy for the AMF network element to judge whether the terminal device has entered or left a certain area according to a configuration of the PRA, and then notify this to another network element, such as a policy network element, that is, a policy control function (PCF). The PCF network element may determine whether the terminal device enters or leaves a PRA area according to the report of the AMF network element.

The PRA area may be understood as a policy area. If the terminal device leaves the PRA area, the PCF network element may send an updated UE policy to the terminal device. For example, the PCF network element may send a target UE policy to the terminal device, wherein the target UE policy is a UE policy corresponding to an area where the terminal device is currently located.

A radio access network (RAN) Notification Area (RNA) is an area definition when the terminal device is in an RRC Inactive state, wherein the area definition is described by one or more TAs or RAN area codes. RRC Inactive is a state of the terminal device, that is, an RRC connection of the terminal device (a control plane connection between the terminal device and the base station) is released, but a connection between the base station and the core network still remains. In this way, the core network device AMF always considers, in the RRC Inactive state, that the terminal device is in a Connected state of connection management (CM), but in fact, the connection between the terminal device and the base station is disconnected. In order to manage the RRC Inactive state, the terminal device may disconnect the RRC connection within a range specified by the RNA, and the base station does not inform the core network side. At the same time, the terminal device may not inform the base station when moving within the RNA area. When the terminal device leaves the designated RNA, the terminal device may trigger an RNA Update process to inform the base station of a base station location where it is currently connected. In addition, similar to TA Update, the terminal device will periodically perform RNA Update within the RNA range to let the base station know that a UE is reachable.

Therefore, for the terminal device in the RRC Inactive state, if the terminal device moves within an RNA range, the terminal device does not need to report the current location to the base station.

Figure 11:
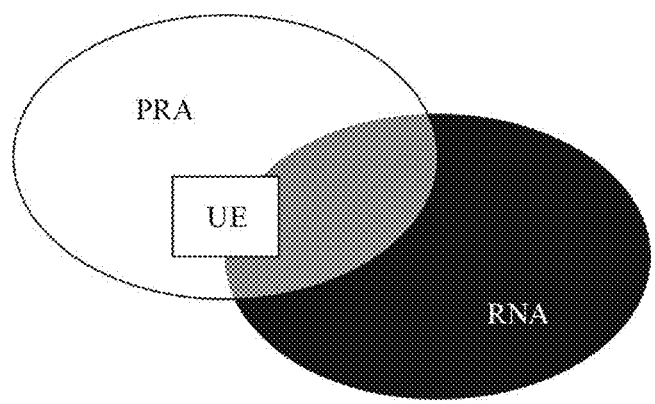
FIG. 11 is a schematic diagram of a PRA and an RNA according to an implementation of the present disclosure.

However, as shown in FIG. 11, if the configuration (or division) of the PRA and the configuration (or division) of the RNA are in an overlapped state, that is, the RNA area crosses a boundary of the PRA, or the PRA area crosses a boundary of the RNA, then the base station cannot sense that the terminal device in the RRC Inactive state goes out or enters the PRA, thus the AMF cannot know whether it enters or leaves the PRA.

Figure 12:
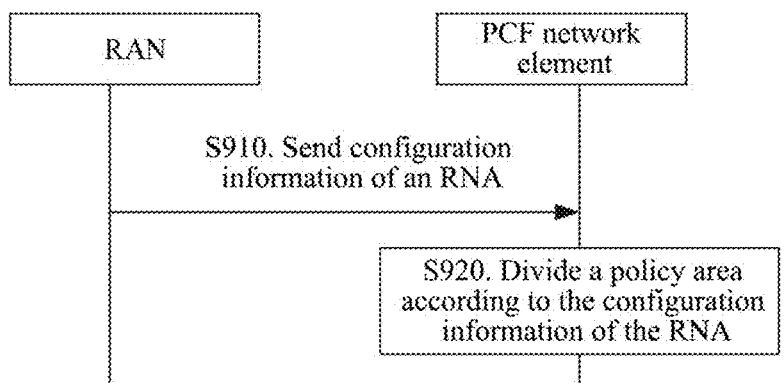
FIG. 12 is a schematic flow chart of another method for sending a policy according to an implementation of the present disclosure.

An implementation of the present disclosure also provides another method for sending a policy, by which an AMF network element is enabled to know, in time, whether a terminal device enters or leaves a policy area. As shown in FIG. 12, the method includes acts S910~S920.

In S910, an access network sends configuration information of an RNA to a PCF network element.

In S920, the PCF network element divides a policy area according to the configuration information of the RNA, wherein the policy area is used for the PCF network element to send a target UE policy to a terminal device.

That the access network sends the configuration information of the RNA to the PCF network element, may mean that the access network sends the configuration information of the RNA to the PCF network element through an AMF network element. For example, the access network sends the configuration information of the RNA to the AMF network element, and the AMF network element transmits transparently the configuration information of the RNA to the PCF network element.

The policy area may be described with the PRA area or the TA area described above, or it may be an area redefined by the PCF network element.

The configuration information of the RNA may include, for example, a cell, a base station or an RAN area node included in a single RNA, and the configuration information of the RNA enables the PCF network element to know a boundary of the RNA.

After the base station allocates the area, it may inform the PCF of the allocated RNA information through the AMF, and then the PCF may divide the policy area according to the RNA information, and subscribe the entry and exit states of the terminal device to the AMF, so that the PCF network element can obtain, in time, whether the terminal device enters or leaves the policy area. The AMF may report to the PCF according to the policy area divided by the PCF. If the AMF senses that the terminal device has entered or left the policy area, the AMF may report to the PCF.

Figure 13:
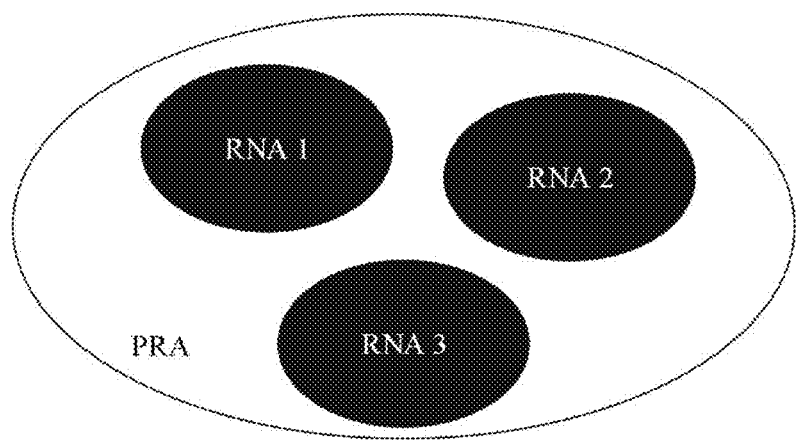
FIG. 13 is a schematic diagram of another PRA and another RNA according to an implementation of the present disclosure.

When the PCF network element divides the policy area, a boundary of the policy area may be enabled to not fall within the RNA, that is to say, the boundary of the policy area does not overlap with the boundary of the RNA. As shown in FIG. 13, when the PCF network element sets the policy area, it is ensured that the policy area cannot cross the boundary of the RNA, and one RNA falls within one policy area, that is, one RNA cannot overlap with two policy areas at the same time.

In a result of area division shown in FIG. 13, one PRA may include three RNAs, that is, one PRA includes RNA1, RNA2 and RNA3.

In an implementation of the present disclosure, one policy area may include one or more RNAs, and the division of the policy area by the PCF network element is not random, but the division may refer to the division of the RNA by the access network, thus when the terminal device in the RRC Inactive state enters or leaves the policy area, it can be sensed by the PCF network element, so that the PCF network element can send the updated UE policy to the terminal device in time.

In addition, the PCF network element may also send a target UE policy to the terminal device when the PLMN corresponding to the network to which the terminal device is connected changes, wherein the target UE policy is a UE policy corresponding to the PLMN where the terminal device registers or camps currently.

The PCF may determine whether the PLMN corresponding to the network connected with the terminal device changes by subscribing a PLMN change event to the AMF.

In a traditional solution, the PCF may only subscribe a PLMN change event to the SMF, and the PLMN change event subscribed to the SMF cannot be used for UE policy update. An implementation of the present disclosure provides a solution that the PCF may sense whether the PLMN corresponding to the network connected with the terminal device changes through an event trigger of subscribing a PLMN change in the AMF, and the PLMN change may be used as a condition for the PCF to trigger UE policy update. A content of the event trigger in the AMF may be shown in Table 5.

TABLE 5

| Policy Control Request Trigger | Description | Condition for Reporting |
| --- | --- | --- |
| PLMN change | Notify PCF when the PLMN where UE is located changes | PCF (UE policy) |
| Location change (tracking area) | The tracking area of UE has changed | PCF (access management (AM) policy, UE policy) |
| Change of UE presence in a presence reporting area | The UE is entering or leaving a PRA | PCF(AM policy, UE policy) |
| Service area restriction change | The subscribed service area restriction information has changed | PCF (AM policy) |
| RAT/Frequency Selection Priority (RFSP) index change | The subscribed RFSP index has changed | PCF (AM policy) |
| Change of the allowed NSSAI | The allowed NSSAI has changed | PCF (AM policy) |

The allowed NSSAI is an allowed NSSAI, and one NSSAI may include one or more S-NSSAIs.

It may be seen from table 5 that the PCF may subscribe area information of the terminal device to the AMF, wherein the area information of the terminal device may include a tracking area and/or a PRA area. The PCF may determine whether the policy area where terminal device is located changes according to the area information of the terminal device.

In addition, PCF may also subscribe the PLMN change event to the AMF to determine whether the PLMN corresponding to the network connected with the terminal device changes.

The PLMN change, the tracking area change and the PRA change in the event trigger may be used as conditions for UE policy update, wherein the PLMN change is a newly added trigger condition in an implementation of the present disclosure. When the PCF senses that the PLMN of the terminal device changes, or the tracking area where the terminal device is located changes, or the PRA area where the terminal device is located changes, the PCF may send the target UE policy to the terminal device.

Figure 14:
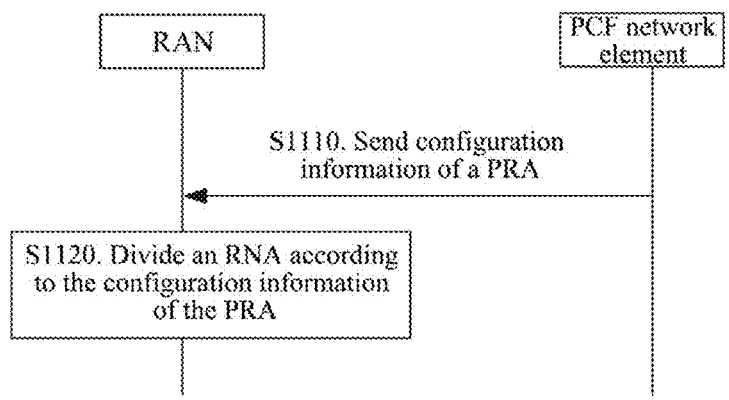
FIG. 14 is a schematic flow chart of another method for sending a policy according to an implementation of the present disclosure.

In addition, an implementation of the present disclosure also provides a method for sending a policy, by which an AMF network element can know whether a terminal device enters or leaves a policy area in time. As shown in FIG. 14, the method includes acts S1110-S1120.

In S1110, a PCF network element may send configuration information of a PRA to an access network, and the policy area is used for the PCF network element to send a target UE policy to the terminal device.

In S1120, the access network divides an RNA according to the configuration information of the PRA.

The PCF network element may send configuration information of the policy area to the access network, which means that the PCF network element sends the configuration information of the policy area to the access network through the AMF network element. For example, the PCF network element sends the configuration information of the policy area to the AMF network element, and the AMF network element transmits transparently the configuration information of the policy area to the access network.

The configuration information of the policy area may include, for example, a situation of a cell, a base station or a TA included in a single policy area, and the configuration information of the policy area enables the access network to know a boundary of the policy area.

Similar to the method shown in FIG. 13, when the division of the RNA by the access network is not random, but the division may refer to the division of the policy area by the PCF network element. When the access network divides the RNA, overlapping of the boundary of the RNA and the boundary of policy area may be avoided, that is, preventing the RNA from crossing the policy area and ensuring that one RNA is only located within one policy area. By this way, the terminal device in the RRC Inactive state is enabled to be sensed by the PCF network element when the terminal enters or leaves the policy area, so that the PCF network element can send the updated UE policy to the terminal device in time.

In addition, referring to the description in FIG. 11, under a situation that there is a boundary crossing between the PRA and the RNA, the PCF will has a problem of being unable to sense that the terminal device leaves or enters the PRA. To solve the problem, the PCF network element may subscribe an event of a UE state (an event trigger) to the AMF network element and/or the SMF network element, that is, the PCF may subscribe an event of whether the terminal device enters the RRC-Inactive state to the AMF network element and/or the SMF network element. The AMF network element and/or the SMF network element may inform the base station of the subscription event, that is, the AMF network element and/or the SMF network element may send a request message to the base station to request the base station to inform the AMF network element and/or the SMF network element in time when the state of the terminal device changes.

The access network may send state information of the terminal device to the PCF network element when the terminal device enters the RRC-Inactive state, which may mean that the access network sends the state information of the terminal device to the PCF network element through the AMF network element.

For example, when the terminal device switches from the RRC-Inactive state to an RRC connected state, and/or when the terminal device switches from the RRC connected state to the RRC-Inactive state, the base station may send the state information of the terminal device to the AMF network element and/or the SMF network element. The AMF network element and/or the SMF network element may send the state information of the terminal device to the PCF network element after receiving the state information of the terminal device sent by the base station, so that the PCF network element knows whether the terminal device has entered the RRC-Inactive state.

Of course, the area division modes shown in FIGS. 12 and 11 may be used not only in the methods for determining and sending policies described above, but also in general problems and other problems caused by boundary crossing between the PRA and the RNA.

The method for random access according to an implementation of the present disclosure has been described in detail above. An apparatus according to an implementation of the present disclosure will be described below with reference to FIGS. 15 to 21. Technical features described in the method implementations are applicable to following apparatus implementations.

Figure 15:
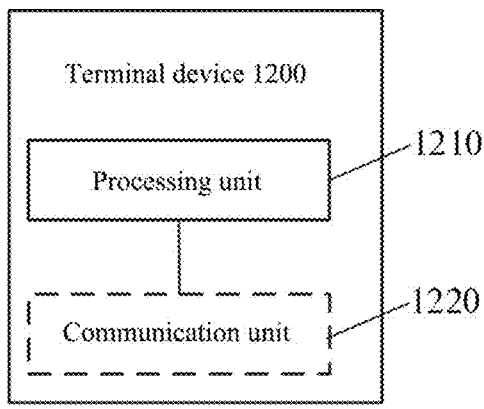
FIG. 15 is a schematic block diagram of a terminal device according to an implementation of the present disclosure.

FIG. 15 is a schematic block diagram of a terminal device according to an implementation of the present disclosure, wherein the terminal device may be any of the terminal devices described above. The terminal device 1200 of FIG. 15 includes a processing unit 1210, wherein the processing unit 1210 is configured to determine a user equipment (UE) policy used by the terminal device according to first information, wherein the first information includes at least one piece of following information: an area where the terminal device is located, a public land mobile network (PLMN) identity (ID) corresponding to a network where the terminal device registered or camped, and a usage duration of the UE policy.

Optionally, the processing unit 1210 is configured to determine the UE policy used by the terminal device when at least one of following situations occurs: the area where the terminal device is located changes, the PLMN ID corresponding to the network where the terminal device registered or camped changes, and the usage duration of the UE policy expires.

Optionally, the area where the terminal device is located is a policy area included in the PLMN corresponding to the network where the terminal device registered or camped, wherein one PLMN includes at least one policy area.

Optionally, the policy area includes at least one cell, tracking area, or coverage area of a base station.

Optionally, the policy area is indicated by a policy area identity.

Optionally, the terminal device further includes a communication unit 1220, configured to receive a first policy area identity from the base station, wherein the first policy area identity is used for determining the area where the terminal device is located, and the first policy area identity includes at least one of following: an identity of the base station, a policy area identity corresponding to the base station, and a policy area identity corresponding to a cell where the terminal device is connected or camps.

Optionally, the first policy area identity is contained in a broadcast message of the base station.

Optionally, the terminal device further includes a communication unit 1220, configured to receive at least one policy area identity and/or an area corresponding to each policy area identity sent by the first network, wherein the at least one policy area identity and/or the area corresponding to each policy area identity is used for determining the area where the terminal device is located.

Optionally, at least one policy area identity and/or the area corresponding to each policy area identity is sent to the terminal device by the first network through a registration request response message or a UE configuration update (UCU) command message.

Optionally, the terminal device further includes a communication unit 1220, configured to send a first request message to the first network according to the first information, wherein the first request message is used for requesting the UE policy used by the terminal device.

Optionally, the communication unit 120 is configured to send a first request message to the first network in response to at least one of following situations: the area where the terminal device is located changes, the PLMN ID corresponding to the network where the terminal device registered or camped changes, and the usage duration of the UE policy expires.

Optionally, the first request message includes at least one piece of following information: area information of the terminal device, the PLMN ID corresponding to the network where the terminal device registered or camped, and a policy identifier.

Optionally, area information of the terminal device includes information of an area where the terminal device leaves and/or information of an area where the terminal device enters.

Optionally, the policy identifier is used for indicating at least one piece of following information: the PLMN ID corresponding to the network where the terminal device registered or camped, a PLMN ID corresponding to a home of the terminal device, and a PLMN ID corresponding to a visited place of the terminal device.

Optionally, the first request message includes a registration request message or a UE policy configuration request message.

Optionally, the registration request message includes a first parameter value, wherein the first parameter value is used for indicating that the registration request message is used for requesting the UE policy used by the terminal device.

Optionally, the registration request message includes a registration type value, and the first parameter value is one of registration type values.

Optionally, the change of the PLMN corresponding to the network where the terminal device registered or camped occurs in at least one of following situations: the terminal device performs a cell handover, and the terminal device enters a connected state from an idle state.

Optionally, the terminal device further includes a communication unit 1220, configured to receive first indication information sent by the first network, wherein the first indication information is used for indicating that equivalent PLMNs have a same UE policy.

Optionally, the UE policy corresponding to the first PLMN received by the terminal device is applicable to an equivalent PLMN of the first PLMN.

Optionally, the processing unit 1210 is further configured to use the UE policy corresponding to the first PLMN, wherein the first PLMN and the target PLMN are equivalent PLMNs, and the target PLMN is the PLMN corresponding to the network where the terminal device registered or camped.

Optionally, the processing unit 1210 is configured to use the UE policy corresponding to the first PLMN under at least one of following situations: the terminal device does not have the UE policy corresponding to the target PLMN, and the UE policy corresponding to the first PLMN is a last updated UE policy.

Optionally, the UE policy corresponding to the first PLMN received by the terminal device is applicable to another PLMN contained within a registration area or a tracking area identity (TAI) list area where the terminal device is located.

Optionally, the processing unit 1210 is further configured to use the UE policy corresponding to the first PLMN, wherein the first PLMN and the target PLMN are PLMNs contained within a same registration area or tracking area identity (TAI) list area, and the target PLMN is the PLMN corresponding to the network where the terminal device registered or camped.

Optionally, the processing unit 1210 is configured to still use a UE policy corresponding to a PLMN identity of TAI-1 under a situation of moving from TAI-1 to TAI-2, wherein PLMN identities contained in the TAI-1 and TAI-2 are different, and the PLMN identities contained in the TAI-1 and TAI-2 are equivalent PLMNs or belong to a same registration area.

Optionally, the terminal device further includes a communication unit 1220, configured to receive the UE policy corresponding to the first PLMN; the processing unit 1210 is configured to store or associate a UE policy corresponding to a second PLMN as the UE policy corresponding to the first PLMN.

Optionally, the second PLMN and the first PLMN are equivalent PLMNs, and/or the second PLMN and the first PLMN are PLMNs corresponding to TAI identities contained in the same registration area or TAI list received by the terminal device.

Optionally, the processing unit 1210 is configured to delete the previously stored UE policy corresponding to the second PLMN.

Optionally, the terminal device further includes a communication unit 1220, wherein the communication unit 1220 is configured to receive terminal policy information, wherein the terminal policy information includes the UE policy corresponding to the first PLMN and a UE policy corresponding to a third PLMN, and the third PLMN and the first PLMN are equivalent PLMNs; the processing unit 1210 is configured to store or associate a UE policy corresponding to a PLMN equivalent to the first PLMN as the UE policy corresponding to the first PLMN, wherein the first PLMN is a PLMN corresponding to a network where the terminal device registered or camped when the terminal device receives the terminal policy information.

Optionally, the processing unit 1220 is configured to use the UE policy corresponding to the first PLMN, under a situation that the terminal device moves from the first PLMN to a PLMN equivalent to the first PLMN.

Optionally, the processing unit 1220 is configured to use the UE policy corresponding to the first PLMN, under a situation of registering or camping in the third PLMN.

Optionally, the terminal device further includes a communication unit 1220, configured to receive terminal policy information, wherein the terminal policy information includes the UE policy corresponding to the first PLMN and a UE policy corresponding to a third PLMN, and the third PLMN and the first PLMN are equivalent PLMNs; the processing unit 1210 is configured to store or associate a UE policy corresponding to another PLMN, except the first PLMN, equivalent to the first PLMN as the UE policy corresponding to the first PLMN, wherein the first PLMN is a PLMN corresponding to a network where the terminal device registered or camped when the terminal device receives the terminal policy information.

Optionally, the processing unit 1210 is configured to use, by the terminal device, the UE policy corresponding to the first PLMN, under a situation that the terminal device moves from the first PLMN to a PLMN, except the third PLMN, equivalent to the first PLMN.

Optionally, the processing unit 1210 is configured to use the UE policy corresponding to the third PLMN under a situation of registering or camping in the third PLMN.

Optionally, the processing unit 1210 is configured to store or associate a UE policy corresponding to another PLMN, except the first PLMN, equivalent to the third PLMN as the UE policy corresponding to the third PLMN under a situation of registering or camping in the third PLMN.

Optionally, the processing unit 1210 is configured to store or associate the UE policy corresponding to the PLMN equivalent to the first PLMN as the UE policy corresponding to the first PLMN under at least one of following situations: the PLMN where the terminal device registered or camped changes, the terminal device receives a UE policy, the terminal device receives a list of equivalent PLMNs from the PLMN where the terminal device registered or camped, and a stored list of equivalent PLMNs changes.

Optionally, the processing unit 1210 is configured to store or associate the UE policy corresponding to another PLMN, except the third PLMN, equivalent to the first PLMN as the UE policy corresponding to the first PLMN under at least one of following situations: the PLMN where the terminal device registered or camped changes, the terminal device receives a UE policy from the PLMN except the third PLMN, the terminal device receives a list of equivalent PLMNs, and a stored list of equivalent PLMNs changes.

Optionally, storing the UE policy corresponding to the PLMN equivalent to the first PLMN is under at least one of following situations: the terminal device determines the UE policy corresponding to the PLMN equivalent to the first PLMN, and the terminal device moves to a new PLMN.

Optionally, information of the equivalent PLMN is received by the terminal device through a core network non-access stratum (NAS) message in a registration process.

Optionally, the terminal device further includes a communication unit 1220, configured to receive second indication information sent by the first network, wherein the second indication information is used for indicating an ID list of PLMNs with a same UE policy.

Optionally, the terminal device further includes a communication unit 1220, configured to receive at least one policy area and/or UE policies corresponding to each policy area sent by the first network; the processing unit 1210 is configured to determine the UE policy used by the terminal device according to the first information and the at least one policy area and/or the UE policy corresponding to each policy area.

Optionally, the processing unit 1210 is configured to store different second information and/or UE policies corresponding to the second information, wherein the second information includes a policy area identity and/or a PLMN identity.

Optionally, the processing unit 1210 is configured to delete the previously stored second information and/or UE policies under a situation that a quantity of the stored second information and/or the UE policies corresponding to the second information reaches a first preset value.

Optionally, the UE policy used by the terminal device includes at least one of following: a wireless local area network (WLAN) selection policy, a UE routing policy, a vehicle to everything policy, an Access Network Discovery and selection Policy (ANDSP).

Optionally, at least one of the first information, the first indication information, the second information, the second indication information and the terminal policy information is obtained by the terminal device through receiving a downlink NAS message sent by an access and mobility management function (AMF), wherein the NAS message includes a container sent by a policy control function (PCF) to the AMF, and the container bears at least one of the first information, the first indication information, the second information, the second indication information, and the terminal policy information.

Figure 16:
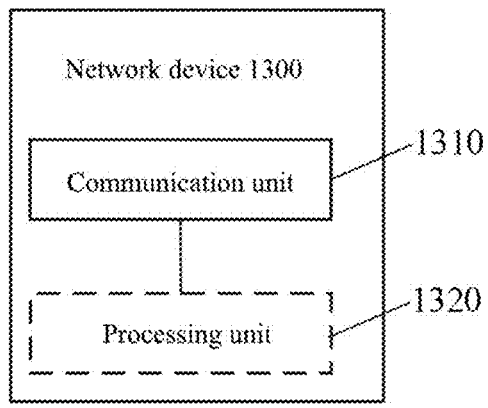
FIG. 16 is a schematic block diagram of a network device according to an implementation of the present disclosure.

FIG. 16 is a schematic block diagram of a network device according to an implementation of the present disclosure. The network device may be any of the above-described network devices, and may be, for example, the above-described first network or PCF network element. The network device 1300 of FIG. 16 includes a communication unit 1310. The communication unit 1310 is configured to send a user equipment (UE) policy used by a terminal device to the terminal device according to first information, wherein the first information includes at least one piece of following information: an area where the terminal device is located, a public land mobile network (PLMN) identity (ID) corresponding to a network where the terminal device registered or camped, and a usage duration of the UE policy.

Optionally, the communication unit 1310 is configured to send the UE policy used by the terminal device to the terminal device when at least one of following situations occurs: the area where the terminal device is located changes, the PLMN ID corresponding to the network where the terminal device registered or camped changes, and the usage duration of the UE policy expires.

Optionally, the area where the terminal device is located is a policy area included in the PLMN corresponding to the network where the terminal device registered or camped, wherein one PLMN includes at least one policy area.

Optionally, the policy area includes at least one cell, tracking area, or coverage area of a base station.

Optionally, the policy area is indicated by a policy area identity.

Optionally, the communication unit 1310 is configured to send at least one policy area identity and/or an area corresponding to each policy area identity to the terminal device, wherein the at least one policy area identity and/or the area corresponding to each policy area identity is used for determining the area where the terminal device is located.

Optionally, at least one policy area identity and/or the area corresponding to each policy area identity is sent to the terminal device by the first network through a registration request response message or a UE configuration update (UCU) command message.

Optionally, the communication unit 1310 is configured to receive a first request message sent by the terminal device, wherein the first request message is used for requesting the UE policy used by the terminal device.

Optionally, the first request message includes at least one piece of following information: area information of the terminal device, the PLMN ID corresponding to the network where the terminal device registered or camped, and a policy identifier.

Optionally, area information of the terminal device includes information of an area where the terminal device leaves and/or information of an area where the terminal device enters.

Optionally, the policy identifier is used for indicating at least one piece of following information: the PLMN ID corresponding to the network where the terminal device registered or camped, a PLMN ID corresponding to a home of the terminal device, and a PLMN ID corresponding to a visited place of the terminal device.

Optionally, the first request message includes a registration request message or a UE policy configuration request message.

Optionally, the registration request message includes a first parameter value, wherein the first parameter value is used for indicating that the registration request message is used for requesting the UE policy used by the terminal device.

Optionally, the registration request message includes a registration type value, and the first parameter value is one of registration type values.

Optionally, the change of the PLMN corresponding to the network where the terminal device registered or camped occurs in at least one of following situations: the terminal device performs a cell handover, and the terminal device enters a connected state from an idle state.

Optionally, the network device further includes a processing unit 1320, configured to subscribe a PLMN change event to an access and mobility management function (AMF) network element to determine whether the PLMN ID corresponding to the network where the terminal device registered or camped changes.

Optionally, the network device further includes a processing unit 1320, configured to subscribe an event of whether the terminal device enters an RRC inactive state to an AMF network element and/or a session management function (SMF) network element, so as to determine whether the terminal device enters the RRC inactive state.

Optionally, the communication unit 1310 is configured to send first indication information to the terminal device, wherein the first indication information is used for indicating that equivalent PLMNs have a same UE policy.

Optionally, the communication unit 1310 is configured to send second indication information to the terminal device, wherein the second indication information is used for indicating an ID list of PLMNs with a same UE policy.

Optionally, the communication unit 1310 is configured to send at least one policy area and/or a UE policy corresponding to each policy area to the terminal device.

Optionally, the UE policy used by the terminal device includes at least one of following: a wireless local area network (WLAN) selection policy, a UE route selection policy, a vehicle to everything policy, an Access Network Discovery and selection Policy (ANDSP).

Figure 17:
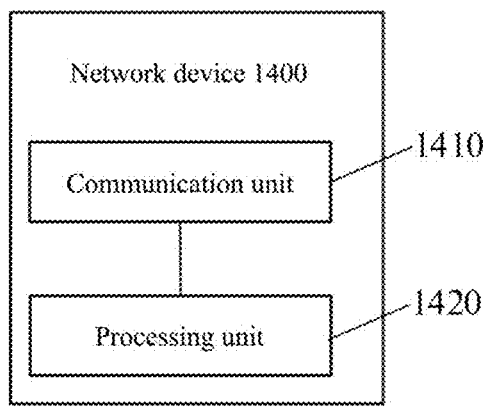
FIG. 17 is a schematic block diagram of another network device according to an implementation of the present disclosure.

FIG. 17 is a schematic block diagram of a network device according to an implementation of the present disclosure. The network device may be any of the above-described network devices, and may be, for example, the above-described first network or PCF network element. The network device 1400 of FIG. 17 includes a communication unit 1410 and a processing unit 1420.

The communication unit 1410 is configured to receive configuration information of an access network notification area (RNA) sent by an access network.

The processing unit 1420 is configured to divide a policy area according to the configuration information of the RNA, wherein the policy area is used for the PCF network element to send a user equipment (UE) policy used by a terminal device to the terminal device.

Optionally, a boundary of the policy area is not within the RNA.

Optionally, the RNA is represented by at least one tracking area or access network area code.

Optionally, the policy area is represented by a presence reporting area (PRA) and/or a tracking area.

Optionally, the communication unit 1410 is configured to send, by the PCF network element, the UE policy used by the terminal device to the terminal device under a situation that a public land mobile network (PLMN) corresponding to the network where the terminal device registered or camped changes.

Optionally, the processing unit 1420 is configured to subscribe a PLMN change event to an access and mobility management function (AMF) network element to determine whether the PLMN corresponding to the network where the terminal device registered or camped changes.

Optionally, the communication unit 1410 is configured to send or update the UE policy used by the terminal device to the terminal device un a situation that the policy area where the terminal device is located changes.

Optionally, the processing unit 1420 is configured to subscribe area information of the terminal device to the AMF network element; determine, according to the area information of the terminal device, whether the policy area where the terminal device is located changes.

Optionally, the processing unit 1420 is configured to subscribe an event of whether the terminal device enters an RRC inactive state to an AMF network element and/or a session management function (SMF) network element, so as to determine whether the terminal device enters the RRC inactive state.

Optionally, the communication unit 140 is configured to send the UE policy used by the terminal device to the terminal device after a first timer expires, wherein the first timer is started by the PCF network element after the PCF network element sends a first UE policy to the terminal device, and the first UE policy is a UE policy sent by the PCF network element to the terminal device before the UE policy used by the terminal device is sent; the processing unit 1420 is configured to restart the first timer in response to sending the UE policy used by the terminal device to the terminal device.

Optionally, the PCF network element sends the UE policy used by the terminal device to the terminal device through a UE configuration update (UCU) process, and the first timer is started when the UCU process is initiated and/or a UCU feedback message is received.

Optionally, the UE policy used by the terminal device includes at least one of following: a wireless local area network (WLAN) selection policy, a UE route selection policy, a vehicle to everything policy, an Access Network Discovery and selection Policy (ANDSP).

Figure 18:
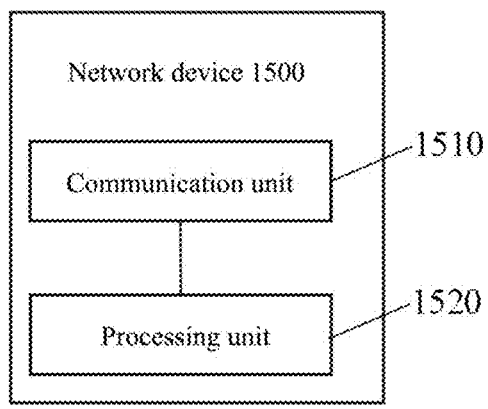
FIG. 18 is a schematic block diagram of another network device according to an implementation of the present disclosure.

FIG. 18 is a schematic block diagram of a network device according to an implementation of the present disclosure. The network device may be any of the above-described network devices, and may be, for example, the above-described AMF network element. The network device 1500 of FIG. 18 includes a communication unit 1510 and a processing unit 1520.

The communication unit 1510 is configured to receive configuration information of a policy area sent by a policy control function (PCF) network element, wherein the policy area is used for the PCF network element to send a UE policy used by a terminal device to the terminal device.

The processing unit 1520 is configured to divide an access network notification area (RNA) according to the configuration information of the policy area.

Optionally, a boundary of the RNA is not within the policy area.

Optionally, the communication unit 1510 is configured to send state information of the terminal device to the PCF network element when the terminal device enters an RRC inactive state.

Figure 19:
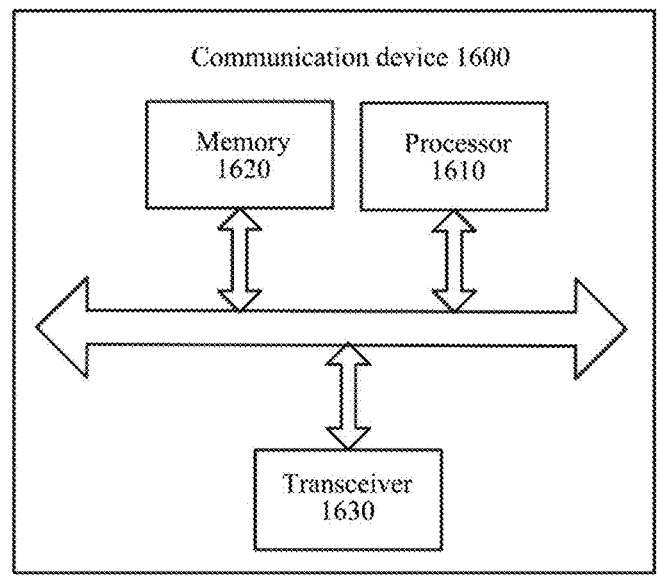
FIG. 19 is a schematic block diagram of a communication device according to an implementation of the present disclosure.

FIG. 19 is a schematic diagram of a structure of a communication device 1600 according to an implementation of the present disclosure. The communication device 1600 shown in FIG. 19 includes a processor 1610. The processor 1610 may call and run a computer program from a memory to implement the method in an implementation of the present disclosure.

Optionally, as shown in FIG. 19, the communication device 1600 may further include a memory 1620. Herein, the processor 1610 may call and run a computer program from the memory 1620 to implement the method in an implementation of the present disclosure.

The memory 1620 may be a separate device independent of the processor 1610 or may be integrated in the processor 1610.

Optionally, as shown in FIG. 19, the communication device 1600 may further include a transceiver 1630, and the processor 1610 may control the transceiver 1630 to communicate with another device. Specifically, information or data may be sent to another device, or information or data sent by another device may be received.

The transceiver 1630 may include a transmitter and a receiver. The transceiver 1630 may further include antennas, and the number of antennas may be one or more.

Optionally, the communication device 1600 may specifically be a network device of an implementation of the present disclosure, and the communication device 1600 may implement corresponding processes implemented by the network device in various methods of implementations of the present disclosure, which will not be repeated here for brevity.

Optionally, the communication device 1600 may be specifically a mobile terminal/terminal device of an implementation of the present disclosure, and the communication device 1600 may implement corresponding processes implemented by the mobile terminal/terminal device in the various methods of implementations of the present disclosure. Specifically, the communication device 1600 may implement corresponding processes implemented by a first mobile terminal and/or a second terminal device in the various methods of implementations of the present disclosure, which will not be repeated here for brevity.

Figure 20:
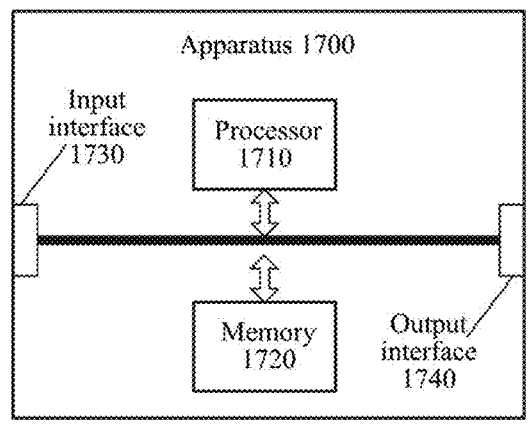
FIG. 20 is a schematic block diagram of an apparatus according to an implementation of the present disclosure.

FIG. 20 is a schematic diagram of a structure of an apparatus of an implementation of the present disclosure. The apparatus 1700 shown in FIG. 20 includes a processor 1710. The processor 1710 may call and run a computer program from a memory to implement the method in an implementation of the present disclosure.

Optionally, as shown in FIG. 20, the apparatus 1700 may further include a memory 1720. Herein, the processor 1710 may call and run a computer program from the memory 1720 to implement the method in an implementation of the present disclosure.

The memory 1720 may be a separate device independent of the processor 1717 or may be integrated in the processor 1710.

Optionally, the apparatus 1700 may further include an input interface 1730. Herein, the processor 1710 may control the input interface 1730 to communicate with another device or apparatus. Specifically, information or data sent by another device or apparatus may be acquired.

Optionally, the apparatus 1700 may further include an output interface 1740. Herein, the processor 1710 may control the output interface 1740 to communicate with another device or apparatus. Specifically, information or data may be output to another device or apparatus.

Optionally, the apparatus may be applied in a network device of an implementation of the present disclosure, and the apparatus may implement corresponding processes implemented by the network device in various methods of implementations of the present disclosure, which will not be repeated here for brevity.

Optionally, the apparatus may be applied in a mobile terminal/terminal device of an implementation of the present disclosure, and the apparatus may implement corresponding processes implemented by the mobile terminal/terminal device in various methods of implementations of the present disclosure, which will not be repeated here for brevity.

It should be understood that the apparatus mentioned in an implementation of the present disclosure may be a chip, wherein the chip may also be referred to as a system-level chip, a system chip, a chip system or a system chip on a chip, etc.

Figure 21:
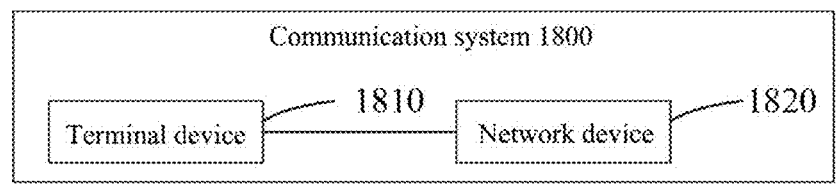
FIG. 21 is a schematic diagram of a communication system according to an implementation of the present disclosure.

FIG. 21 is a schematic block diagram of a communication system 1800 provided according to an implementation of the present disclosure. As shown in FIG. 21, the communication system 1800 may include a terminal device 1810 and a network device 1820.

Herein, the terminal device 1810 may be configured to implement the corresponding functions implemented by the terminal device in the above-mentioned method, and the network device 1820 may be configured to implement the corresponding functions implemented by the network device in the above-mentioned method, which will not be repeated here for brevity.

It should be understood that, the processor in an implementation of the present disclosure may be an integrated circuit chip having a signal processing capability. In an implementation process, the acts of the foregoing method implementations may be implemented by using an integrated logic circuit of hardware in the processor or instructions in a form of software. The processor may be a general purpose processor, a digital signal processor (Digital Signal Processing, DSP), an application specific integrated circuit (Application Specific Integrated Circuit, ASIC), a field programmable gate array (Field Programmable Gate Array, FPGA) or another programmable logic device, a discrete gate or a transistor logic device, or a discrete hardware component. The processor may implement or perform methods, acts and logical block diagrams disclosed in this implementation of the present disclosure. The general purpose processor may be a microprocessor, or the processor may be any conventional processor or the like. The acts of the method disclosed with reference to this implementation of the present disclosure may be directly implemented by a hardware decoding processor, or may be implemented by a combination of hardware and software modules in the decoding processor. The software modules may be located in a storage medium commonly used in the art, such as a random access memory, a flash memory, a read-only memory, a programmable read-only memory or an electrically erasable programmable memory, or a register. The storage medium is located in the memory, and the processor reads the information in the memory and completes the acts of the above method in combination with its hardware.

It may be understood that, the memory in this implementation of the present disclosure may be a volatile memory or a non-volatile memory, or may include both a volatile memory and a non-volatile memory. The non-volatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), and is used as an external cache. Through exemplary but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchronous link dynamic random access memory (Synchlink DRAM, SLDRAM), and a direct rambus dynamic random access memory (Direct Rambus RAM, DR RAM). It should be noted that the memories in the systems and methods described in this specification are intended to include, but are not limited to, these and any other suitable types of memories.

It should be understood that, the above memory is exemplary but not limitative description. For example, the memory in an implementation of the present disclosure may also be a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM), a Direct Rambus RAM (DR RAM), or the like. That is, memories in implementations of the present disclosure are intended to include, but are not limited to, these and any other suitable types of memories.

An implementation of the present disclosure further provides a computer readable storage medium configured to store a computer program.

Optionally, the computer readable storage medium may be applied in a network device of an implementation of the present disclosure, and the computer program causes a computer to perform corresponding processes implemented by the network device in various methods of implementations of the present disclosure, which will not be repeated here for brevity.

Optionally, the computer readable storage medium may be applied in a mobile terminal/terminal device of an implementation of the present disclosure, and the computer program causes a computer to perform corresponding processes implemented by the mobile terminal/terminal device in various methods of implementations of the present disclosure, which will not be repeated here for brevity.

An implementation of the present disclosure also provides a computer program product, including computer program instructions.

Optionally, the computer program product may be applied in a network device of an implementation of the present disclosure, and the computer program instructions cause a computer to perform corresponding processes implemented by the network device in various methods of implementations of the present disclosure, which will not be repeated here for brevity.

Optionally, the computer program product may be applied in a mobile terminal/terminal device of an implementation of the present disclosure, and the computer program instructions cause a computer to perform corresponding flows implemented by the mobile terminal/terminal device in various methods according to implementations of the present disclosure, which will not be repeated here for brevity.

An implementation of the present disclosure also provides a computer program.

Optionally, the computer program may be applied in a network device of an implementation of the present disclosure. When the computer program is run on a computer, the computer is caused to perform corresponding processes implemented by the network device in various methods of implementations of the present disclosure, which will not be repeated here for brevity.

Optionally, the computer program may be applied in a mobile terminal/terminal device of an implementation of the present disclosure. When the computer program is run on a computer, the computer is caused to perform corresponding processes implemented by the mobile terminal/terminal device in various methods of implementations of the present disclosure, which will not be repeated here for brevity.

Those of ordinary skill in the art will recognize that the exemplary elements and algorithm acts described in combination with implementations disclosed herein may be implemented in electronic hardware, or a combination of computer software and electronic hardware. Whether these functions are implemented in hardware or software depends on the specific application and design constraints of the technical solution. Skilled artisans may use different methods to implement the described functions in respect to each particular application, but such implementation should not be considered to be beyond the scope of the present disclosure.

Those skilled in the art may clearly learn that for convenience and conciseness of description, the specific working processes of the systems, the apparatuses and the units described above may refer to the corresponding processes in the aforementioned method implementations, which will not be repeated here.

In several implementations according to the present disclosure, it should be understood that the disclosed systems, apparatuses and methods may be implemented in other ways. For example, the apparatus implementations described above are only illustrative, for example, the division of the units is only a logical function division, and there may be other division modes in an actual implementation, for example, multiple units or components may be combined or integrated into another system, or some features may be ignored or not executed. On the other hand, the mutual coupling or direct coupling or communication connection shown or discussed may be indirect coupling or communication connection through some interface, apparatus or unit, and may be in electrical, mechanical or other forms.

The unit described as a separate component may or may not be physically separated, and the component shown as a unit may or may not be a physical unit, i.e., it may be located in one place or may be distributed over multiple network units. Some or all of the units may be selected according to actual needs to achieve the purpose of the implementations.

In addition, various functional units in various implementations of the present disclosure may be integrated in one processing unit, or the various units may be physically present separately, or two or more units may be integrated in one unit.

The functions may be stored in a computer readable storage medium if realized in a form of software functional units and sold or used as a separate product. As for this understanding, the technical solution of the present disclosure, in essence, or the part contributing to the prior art, or the part of the technical solution, may be embodied in the form of a software product stored in a storage medium, including a number of instructions for causing a computer device (which may be a personal computer, a server, or a network device and the like) to perform all or part of the acts of the method described in various implementations of the present disclosure. And the foregoing storage medium includes: any medium that may store program codes, such as a USB flash drive, a removable hard disk, a Read-Only Memory (ROM), a Random Access Memory (RAM), a magnetic disk, an optical disc, or the like.

What are described above are merely exemplary implementations of the present disclosure, but the protection scope of the present disclosure is not limited thereto. Any variation or substitution that may be easily conceived by a person skilled in the art within the technical scope disclosed by the present disclosure shall be included within the protection scope of the present disclosure. Therefore, the protection scope of the present disclosure shall be subject to the protection scope of the claims.

The invention claimed is:

1. A method for determining a policy, comprising:
   determining, by a terminal device, a user equipment (UE) policy corresponding to a first public land mobile network (PLMN) as a target UE policy to be used in a target PLMN,
   wherein the first PLMN and the target PLMN are equivalent PLMNs, and the UE policy corresponding to the first PLMN received by the terminal device is applicable to the target PLMN;
   using, by the terminal device, the UE policy corresponding to the first PLMN as the target UE policy, wherein the target PLMN is a PLMN corresponding to a network where the terminal device selected;
   wherein using, by the terminal device, the UE policy corresponding to the first PLMN as the target UE policy, comprises:
   using, by the terminal device, the UE policy corresponding to the first PLMN as the target UE policy under at least one of following situations: the terminal device does not have a UE policy corresponding to the target PLMN, and the UE policy corresponding to the first PLMN is the last updated UE policy; and
   wherein
   if there is a UE policy corresponding to the target PLMN in the terminal device, the terminal device uses the UE policy corresponding to the target PLMN as the target UE policy; and
   if there is no UE policy corresponding to the target PLMN in the terminal device, and the UE policy corresponding to the first PLMN is the last updated UE policy, then the terminal device uses the UE policy corresponding to the first PLMN as the target UE policy.

2. The method of claim 1, wherein the target PLMN corresponding to the network selected by the terminal device is a PLMN corresponding to a network where the terminal device registered or camped on.

3. The method of claim 1, wherein the UE policy corresponding to the first PLMN received by the terminal device is applicable to an equivalent PLMN of the first PLMN, and in a terminal registration process, a core network element AMF sends the equivalent PLMN list and/or a precedence of the equivalent PLMN list to the terminal device.

4. The method of claim 1, wherein the method further comprises:
   using, by the terminal device, the UE policy corresponding to the first PLMN, under a situation that the terminal device moves from the first PLMN to a PLMN equivalent to the first PLMN.

5. The method of claim 1, wherein the UE policy used by the terminal device comprises at least one of following: a wireless local area network (WLAN) selection policy, a UE route selection policy, a vehicle to everything policy, an Access Network Discovery and selection Policy (ANDSP).

6. A terminal device, comprising: a processor and a memory, wherein the memory is configured to store a computer program and the processor is configured to call and run the computer program stored in the memory to
determine a user equipment (UE) policy corresponding to a first public land mobile network (PLMN) as a target UE policy to be used in a target PLMN,
wherein the first PLMN and the target PLMN are equivalent PLMNs, and the UE policy corresponding to the first PLMN received by the terminal device is applicable to the target PLMN;
use the UE policy corresponding to the first PLMN as the target UE policy, wherein the target PLMN is a PLMN corresponding to a network where the terminal device selected;
use the UE policy corresponding to the first PLMN as the target UE policy under at least one of following situations: the terminal device does not have a UE policy corresponding to the target PLMN, and the UE policy corresponding to the first PLMN is a last updated UE policy;
wherein
if there is a UE policy corresponding to the target PLMN in the terminal device, the terminal device uses the UE policy corresponding to the target PLMN as the target UE policy; and
if there is no UE policy corresponding to the target PLMN in the terminal device, and the UE policy corresponding to the first PLMN is the last updated UE policy, then the terminal device uses the UE policy corresponding to the first PLMN as the target UE policy.

7. The terminal device of claim 6, wherein the target PLMN corresponding to the network selected by the terminal device is a PLMN corresponding to a network where the terminal device registered or camped on.

8. The terminal device of claim 6, wherein the UE policy corresponding to the first PLMN received by the terminal device is applicable to an equivalent PLMN of the first PLMN, and in a terminal registration process, a core network element AMF sends the equivalent PLMN list and/or a precedence of the equivalent PLMN list to the terminal device.

9. The terminal device of claim 6, wherein the processor is configured to call and run the computer program stored in the memory to:
use the UE policy corresponding to the first PLMN, under a situation that the terminal device moves from the first PLMN to a PLMN equivalent to the first PLMN.

10. The terminal device of claim 6, wherein the UE policy used by the terminal device comprises at least one of following: a wireless local area network (WLAN) selection policy, a UE route selection policy, a vehicle to everything policy, an Access Network Discovery and selection Policy (ANDSP).

11. A non-transient computer-readable medium, storing one or more instructions which are used for performing:
determining, by a terminal device, a user equipment (UE) policy corresponding to a first public land mobile network (PLMN) as a target UE policy to be used in a target PLMN,
wherein the first PLMN and the target PLMN are equivalent PLMNs, and the UE policy corresponding to the first PLMN received by the terminal device is applicable to the target PLMN;
using, by the terminal device, the UE policy corresponding to the first PLMN as the target UE policy, wherein the target PLMN is a PLMN corresponding to a network where the terminal device selected;
wherein using, by the terminal device, the UE policy corresponding to the first PLMN as the target UE policy, comprises:
using, by the terminal device, the UE policy corresponding to the first PLMN as the target UE policy under at least one of following situations: the terminal device does not have a UE policy corresponding to the target PLMN, and the UE policy corresponding to the first PLMN is the last updated UE policy; and
wherein
if there is a UE policy corresponding to the target PLMN in the terminal device, the terminal device uses the UE policy corresponding to the target PLMN as the target UE policy; and
if there is no UE policy corresponding to the target PLMN in the terminal device, and the UE policy corresponding to the first PLMN is the last updated UE policy, then the terminal device uses the UE policy corresponding to the first PLMN as the target UE policy.

12. The non-transient computer-readable medium of claim 11, wherein the target PLMN corresponding to the network selected by the terminal device is a PLMN corresponding to a network where the terminal device registered or camped on.

13. The non-transient computer-readable medium of claim 11, wherein the UE policy corresponding to the first PLMN received by the terminal device is applicable to an equivalent PLMN of the first PLMN, and in a terminal registration process, a core network element AMF sends the equivalent PLMN list and/or a precedence of the equivalent PLMN list to the terminal device.

14. The non-transient computer-readable medium of claim 11, wherein the one or more instructions are further used for performing:
using, by the terminal device, the UE policy corresponding to the first PLMN, under a situation that the terminal device moves from the first PLMN to a PLMN equivalent to the first PLMN.

15. The non-transient computer-readable medium of claim 11, wherein the UE policy used by the terminal device comprises at least one of following: a wireless local area network (WLAN) selection policy, a UE route selection policy, a vehicle to everything policy, an Access Network Discovery and selection Policy (ANDSP).

* * * * *